United States Patent
Fisher et al.

(10) Patent No.: US 11,727,083 B2
(45) Date of Patent: *Aug. 15, 2023

(54) SYSTEM AND METHOD FOR AUTOMATIC SELECTION FOR DYNAMIC SITE COMPILATION WITHIN A CLOUD-BASED CONTENT HUB ENVIRONMENT

(71) Applicant: ORACLE INTERNATIONAL CORPORATION, Redwood Shores, CA (US)

(72) Inventors: Robin Fisher, Palo Alto, CA (US); David Peterson, Snohomish, WA (US); Hareesh S. Kadlabalu, Plainview, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,703

(22) Filed: Jun. 27, 2022

(65) Prior Publication Data

US 2022/0335095 A1 Oct. 20, 2022

Related U.S. Application Data

(63) Continuation of application No. 17/019,182, filed on Sep. 11, 2020, now Pat. No. 11,372,947.

(Continued)

(51) Int. Cl.
*G06F 16/958* (2019.01)
*G06F 8/41* (2018.01)
(Continued)

(52) U.S. Cl.
CPC .............. *G06F 16/958* (2019.01); *G06F 8/41* (2013.01); *G06F 16/252* (2019.01);
(Continued)

(58) Field of Classification Search
CPC ........ G06F 8/41; G06F 8/4441; G06F 16/252; G06F 16/907; G06F 16/951;
(Continued)

(56) References Cited

U.S. PATENT DOCUMENTS

| | | |
|---|---|---|
| 6,606,525 B1 | 8/2003 | Muthuswamy |
| 10,222,942 B1 | 3/2019 | Zeiler |

(Continued)

FOREIGN PATENT DOCUMENTS

| | | |
|---|---|---|
| EP | 2428920 | 3/2012 |
| WO | 2012160499 | 11/2012 |

OTHER PUBLICATIONS

Gatsby, "The Fastest Frontend Framework for Headless CMSs"; accessed at <https://www.gatsbyjs.com/> on Feb. 2, 2022, 11 pages.

(Continued)

*Primary Examiner* — Le H Luu
(74) *Attorney, Agent, or Firm* — Tucker Ellis LLP

(57) ABSTRACT

Described herein are systems and methods automatic selection for dynamic site compilation in a cloud-based content hub environment. In accordance with an embodiment, embodiments provide an artificial intelligence/machine learning (AI/ML) engine that monitors and collects both content and consumption analytics associated with content items on a webpage. Based upon an analysis of such metrics, content can be automatically tagged such that the content item can be statically compiled with the website (optimized for viewing speed and user experience), or dynamically fetched/loaded on a load or refresh of the website.

20 Claims, 23 Drawing Sheets

Related U.S. Application Data

(60) Provisional application No. 62/900,266, filed on Sep. 13, 2019.

(51) Int. Cl.
*G06F 16/25* (2019.01)
*H04L 41/16* (2022.01)
*G06F 16/957* (2019.01)
*G06F 16/951* (2019.01)
*G06F 16/907* (2019.01)
*H04L 67/01* (2022.01)
*G06F 18/214* (2023.01)

(52) U.S. Cl.
CPC .......... *G06F 16/907* (2019.01); *G06F 16/951* (2019.01); *G06F 16/957* (2019.01); *G06F 16/9574* (2019.01); *G06F 18/214* (2023.01); *H04L 41/16* (2013.01); *H04L 67/01* (2022.05)

(58) Field of Classification Search
CPC .. G06F 16/957; G06F 16/9574; G06F 16/958; G06F 16/285; G06F 16/9535; G06F 16/955; G06F 16/972; G06F 18/214; G06F 3/0486; G06F 40/237; G06F 8/20; G06F 8/38; G06N 3/08; G06N 20/00; H04L 41/16; H04L 67/01; H04L 67/02; H04L 67/10; H04L 67/55; H04L 67/568; H04L 67/306
See application file for complete search history.

(56) References Cited

U.S. PATENT DOCUMENTS

| | | | |
|---|---|---|---|
| 10,459,699 B2 * | 10/2019 | Geva | .......... G06F 8/38 |
| 11,182,456 B2 | 11/2021 | Fisher | |
| 11,188,614 B2 | 11/2021 | Fisher | |
| 11,372,947 B2 | 6/2022 | Fisher | |
| 2007/0078942 A1 * | 4/2007 | Christfort | ................ G06F 8/20 |
| | | | 709/217 |
| 2007/0240037 A1 | 10/2007 | Law-How-Hung | |
| 2014/0222533 A1 | 8/2014 | Ovick | |
| 2014/0222553 A1 | 8/2014 | Bowman | |
| 2014/0244784 A1 * | 8/2014 | Jaskiewicz | ............ H04L 67/306 |
| | | | 709/217 |
| 2015/0106157 A1 * | 4/2015 | Chang | .................. G06F 40/237 |
| | | | 705/7.29 |
| 2015/0142764 A1 * | 5/2015 | Burgmeier | ............ G06F 16/285 |
| | | | 707/694 |
| 2015/0347432 A1 | 12/2015 | Tsai | |
| 2016/0188592 A1 * | 6/2016 | Fergus | ................ G06F 16/9535 |
| | | | 707/738 |
| 2016/0358096 A1 | 12/2016 | Bannur | |
| 2017/0090734 A1 * | 3/2017 | Fitzpatrick | ............ G06F 3/0486 |
| 2017/0109763 A1 * | 4/2017 | Tsai | .................... G06F 16/9535 |
| 2017/0161253 A1 | 6/2017 | Silver | |
| 2017/0228790 A1 | 8/2017 | Smith | |
| 2017/0243234 A1 | 8/2017 | Bajaj | |
| 2018/0025013 A1 * | 1/2018 | Goldstein | ............. G06F 16/958 |
| | | | 707/661 |
| 2019/0026382 A1 * | 1/2019 | Abrahami | ............. G06F 16/955 |
| 2019/0149591 A1 * | 5/2019 | Abrahami | ............. G06F 16/972 |
| | | | 717/109 |
| 2019/0155880 A1 | 5/2019 | Vinay | |
| 2019/0228048 A1 * | 7/2019 | O'Donnell | ............ G06F 16/958 |
| 2019/0258706 A1 | 8/2019 | Li | |
| 2020/0241972 A1 | 7/2020 | Dain | |
| 2020/0372206 A1 | 11/2020 | Fialkow | |
| 2021/0081469 A1 | 3/2021 | Fisher | |

OTHER PUBLICATIONS

Wix, "Create a website you're proud of"; accessed at <https://www.wix.com/> on Feb. 2, 2022, 12 pages.

Weebly, "Build a professional website that grows with your business"; accessed at <https://www.weebly.com/> on Feb. 2, 2022, 4 pages.

* cited by examiner

FIGURE 12

```
┌─────────────────────────────────────────────────────────────┐
│  Provide, at a computer including a microprocessor, a cloud-based │
│  content hub comprising an application interface adapted to receive │
│  commands, a content management system comprising at least one │
│  database, a website development kit having a connection to at least │
│  the content management system and a user interface, a web server │
│  comprising a website database, and a compiler, the compiler having │
│          access to a repository of compiler instructions          │
│                            1910.                                  │
└─────────────────────────────────────────────────────────────┘
                              │
                              ▼
┌─────────────────────────────────────────────────────────────┐
│  Receive an instruction to compile a website, the instruction including │
│     at least one content item at the content management database. │
│                            1920                                   │
└─────────────────────────────────────────────────────────────┘
                              │
                              ▼
┌─────────────────────────────────────────────────────────────┐
│  Check an instance of the content item for metadata indicative of an │
│     indication to compile the content item statically or dynamically. │
│                            1930                                   │
└─────────────────────────────────────────────────────────────┘
                              │
                              ▼
┌─────────────────────────────────────────────────────────────┐
│  Upon the metadata being indicative to compile the instance of the │
│ content item statically, and upon a compiler instruction being present │
│    in the repository, the compiler instruction being associated with a │
│   type of the content item, compile the instance of the content item │
│                           statically.                             │
│                            1940                                   │
└─────────────────────────────────────────────────────────────┘
```

*FIGURE 19*

SYSTEM AND METHOD FOR AUTOMATIC SELECTION FOR DYNAMIC SITE COMPILATION WITHIN A CLOUD-BASED CONTENT HUB ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY AND CROSS REFERENCE TO RELATED APPLICATIONS

This application is a continuation of U.S. patent application titled "SYSTEM AND METHOD FOR AUTOMATIC SELECTION FOR DYNAMIC SITE COMPILATION WITHIN A CLOUD-BASED CONTENT HUB ENVIRONMENT", application Ser. No. 17/019,182, filed Sep. 11, 2020, which claims the benefit of priority to U.S. Provisional application titled "SYSTEM AND METHOD FOR DYNAMIC SITE COMPILATION WITHIN A CLOUD-BASED CONTENT HUB ENVIRONMENT", Application No. 62/900,266, filed Sep. 13, 2019; each of which above applications is herein incorporated by reference.

This application is related to and incorporates by reference herein the following applications: U.S. patent application titled: "SYSTEM AND METHOD FOR PROVIDING A USER INTERFACE FOR DYNAMIC SITE COMPILATION WITHIN A CLOUD-BASED CONTENT HUB ENVIRONMENT", application Ser. No. 17/019,179, filed Sep. 11, 2020, and subsequently issued as U.S. Pat. No. 11,182,456 on Nov. 23, 2021; U.S. patent application titled "SYSTEM AND METHOD FOR PROVIDING CUSTOM COMPONENT COMPILATION WITHIN A CLOUD-BASED CONTENT HUB ENVIRONMENT", application Ser. No. 17/019,180, filed Sep. 11, 2020; and U.S. patent application titled "SYSTEM AND METHOD FOR AUTOMATIC SUGGESTION FOR DYNAMIC SITE COMPILATION WITHIN A CLOUD-BASED CONTENT HUB ENVIRONMENT", application Ser. No. 17/019,181, filed Sep. 11, 2020, and subsequently issued as U.S. Pat. No. 11,188,614 on Nov. 30, 2021; each of which applications are herein incorporated by reference.

FIELD OF INVENTION

This disclosure relates generally to website development; and more particularly, to systems and methods for dynamic site compilation for distributed website development within a cloud-based content hub environment.

BACKGROUND

During the development of any given website, especially those websites driven by content, as well as updates to the content, there are generally two ways in which to ensure that the website content is delivered to a viewer of a website. These two methods included dynamic fetching of content from a remote location, as well as the static caching of content at a local storage.

In accordance with an embodiment, static content can generally be thought of as a file that is stored on the server side of a website (e.g., in a local storage), and is presented in a same manner every time the content is delivered to a viewer of the website. Examples of such static content include, but are not limited to, images, gifs, HTML, and other types of content that generally do not change between different loads of a given website. Static content can be considered to be like a printed publication—once the content has been printed, it is generally not changed or updated. One of the advantages of static content is that it generally loads very quickly as it is stored a local storage.

In accordance with an embodiment, conversely, dynamic content is content that generally changes due to specific factors of a user at each visit, or content that changes due to updated or changing content creation on a website. Generally, websites that heavily rely upon dynamic content can change from load to load of a website, due to, for example, a team of content creators updating and publishing updates to a website in real time. While dynamic content provides the advantage that a website can stay up to date from between subsequent loads of a website (or push-refreshes), such content generally loads more slowly than cached content as such dynamic content is stored at a remote location to the website server.

More and more, today's websites comprise a mix of both static and dynamic content, while website developers are generally less technically minded. As such, it is becoming increasingly important to deliver a mechanism that can allow a non-technical content developer to optimize his or her website in a manner that will provide the best, and most updated (in terms of content), experience to an end user visiting such a website.

SUMMARY

In accordance with an embodiment, the presently disclosed embodiments allow a non-technical user, as well as technical users, such as website developers, to "mark", or flag, various components of a website or page. One category of such marks or flags can indicate that such items marked or flagged with this category of are to be dynamically loaded upon website access (e.g., fetched from a source and then loaded into a website for viewing), while another category of mark or flag can indicate items so marked to be fixed at compile time (e.g., static cache, that is the content is compiled within the published website).

In accordance with an embodiment, the cost of complex content management system (CMS) queries can be reduced in the running site by electing to have certain components compiled into the page (static cache). The CMS query is then executed during compilation and results inserted directly into the compiled page. This results in better user experience and allows for very large scalability by offloading repetitive calls to the CMS server.

In accordance with an embodiment, additionally disclosed herein is an AI/ML engine (also referred to variously herein as an AI/ML analytics engine, and analytics engine) that can utilize both content and consumption analytics in providing suggested tags to a user, and/or automatically tag certain components and content items of a website based upon, for example, a confidence score.

BRIEF DESCRIPTION OF THE FIGURES

FIG. 12 is a screen shot of an exemplary website design portal/toolkit as provided in a cloud-based content hub, in accordance with an embodiment.

FIG. 19 is a flowchart of a method for providing custom component compilation within a cloud-based content hub environment, in accordance with an embodiment.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

In accordance with an embodiment, content management systems enable content to be created, uploaded, accessed, and modified by a plurality of users. For example, a content item such as a document can be created and uploaded by one user, and subsequently accessed and modified by other users. Additionally, a single document can be accessed (e.g., viewed) concurrently by multiple users. Content management systems can be useful for enterprises in which, for example, several individuals collaborate on a project by accessing the same document or set of documents.

Complexities can arise, however, when a user wishes to upload multiple content items. In such situations, the user can generally be presented with an option to create an archive file (e.g., zip file, or other archive file type that merges/compresses multiple content files into a single file) so that all the files to be uploaded to an ECM application and perform a single check-in operation in order avoid multiple check-in operations that would be required if each content item was uploaded individually. However, the uploaded archive file not exploded by an ECM application into an easy to use hierarchy, nor are the content items represented outside of the archive file.

Figure 1:
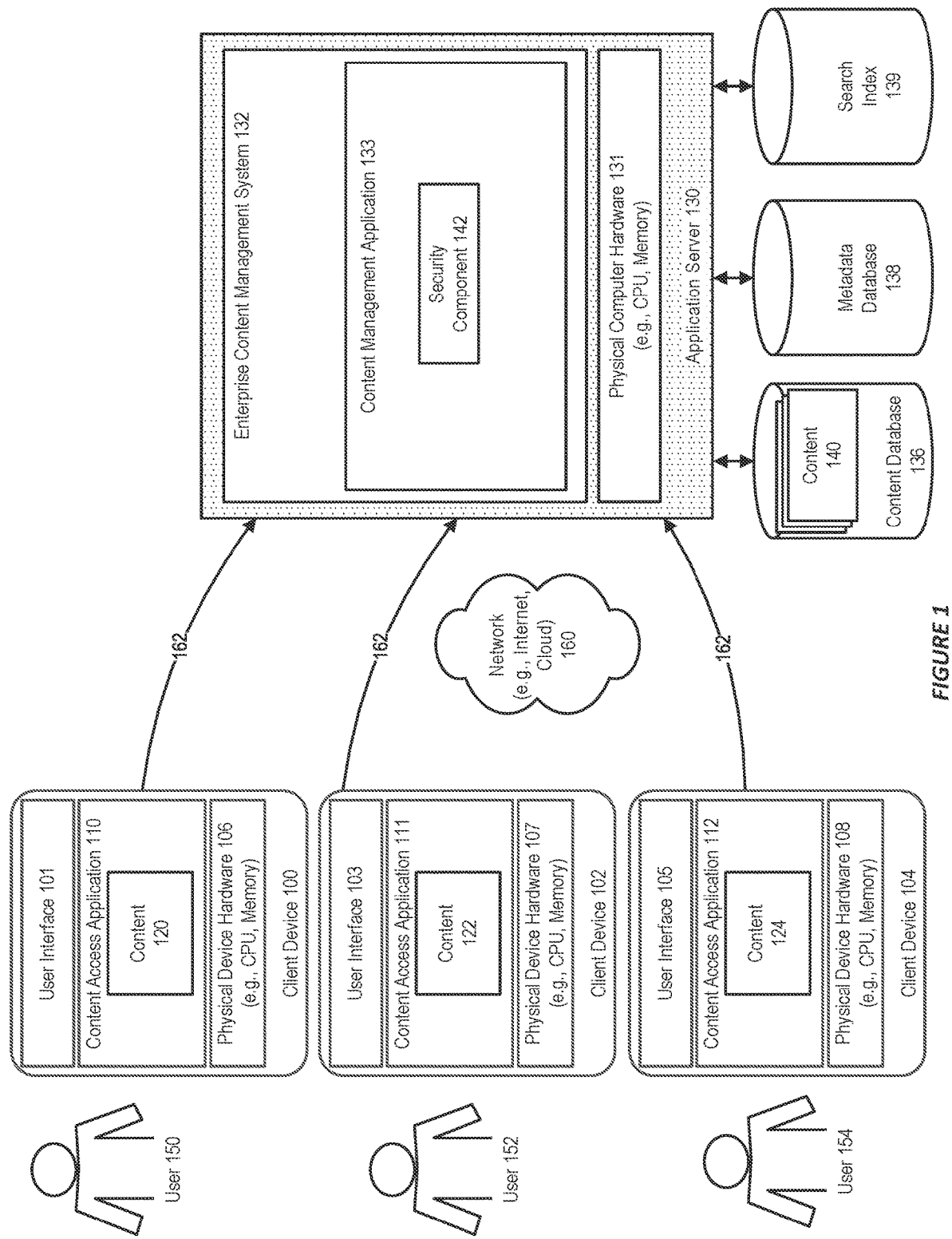
FIG. 1 illustrates a system or archive file check-in/out in an enterprise content management system, in accordance with an embodiment.

FIG. 1 illustrates a system or archive file check-in/out in an enterprise content management system, in accordance with an embodiment As illustrated in FIG. 1, in accordance with an embodiment, for each of a plurality of client devices 100, 102, and 104 having a user interface 101, 103, 105 and physical device hardware 106, 107, 108 (e.g., CPU, memory), the client device can be provided with a content access application 110, 111, 112 for execution thereon.

In accordance with an embodiment, the client device can communicate 162 with an application server 130 that includes a physical computer hardware 131 (e.g. CPU, memory) and an enterprise content management system 132.

In accordance with an embodiment, the content access application at the client device can communicate with the enterprise content management system via a network 160 (e.g., the Internet, or a cloud environment). The content access application can be configured to enable a user 150, 152, 154 to view, upload, modify, delete, or otherwise access content such as content items 120, 122, 124 at each client device. For example, new content can be added or uploaded to the enterprise content management system by a user interacting with the content access application on an associated client device. The content can be transmitted to the enterprise content management system for storage.

In accordance with an embodiment, the enterprise content management system can be or include a platform for consolidating content that can be managed by a plurality of users of an enterprise. In accordance with an embodiment, the enterprise content management system can be configured to communicate with a content database 136 for storing content (or content items) 140, and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles.

In accordance with an embodiment, the enterprise content management system can be configured to associate metadata with the content. Metadata can include information about an item of content, such as its title, author, release date, historical data such as who has accessed the item and when, a location where the content is stored, and the like.

In accordance with an embodiment, the metadata can be stored in a metadata database 138. In accordance with an embodiment, the enterprise content management system can be configured to communicate with the metadata database to access metadata stored therein, and to store metadata generated by the system in the metadata database.

In accordance with an embodiment, the enterprise content management system can also be configured to communicate with a search index 139. The search index can be configured to provide indexing and searching of content and data stored in the content database and the metadata database. In accordance with an embodiment, the search index can be a relational database management system (RDBMS) or a search tool such as Oracle Secure Enterprise Search (Oracle SES).

In accordance with an embodiment, content stored within the content database can be checked out for modification by a user at the user's client device, and checked back in to the enterprise content management system.

In accordance with an embodiment, a checked-out document can be locked while checked out to a particular user, to prevent other users from modifying the checked-out document. However, the system can be configured to permit viewing of the document by other users while it is checked out. In accordance with an embodiment, new versions of content can be created and stored in the content database of the enterprise content management system.

In accordance with an embodiment, the enterprise content management system can further include a content management application 133 including a security component 142. The security component can include or store a security data including user permissions and privileges with respect to particular items of content and/or particular actions. For example, the security data can indicate that certain users are permitted to access and/or modify certain documents. As another example, the security data can indicate that only certain users are permitted to create links between content items, to modify certain content items, or to delete content items.

Figure 2:
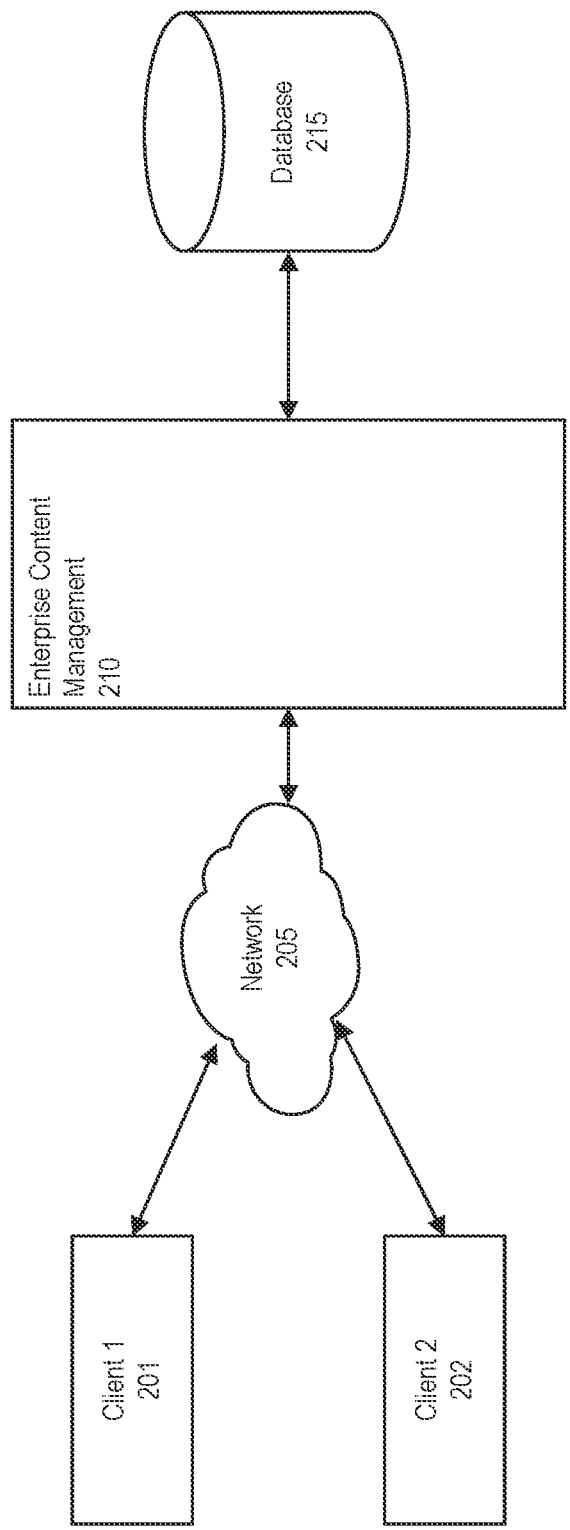
FIG. 2 illustrates a system or archive file check-in/out in an enterprise content management system, in accordance with an embodiment.

FIG. 2 illustrates a system or archive file check-in/out in an enterprise content management system, in accordance with an embodiment.

In accordance with an embodiment, in general, an Enterprise Content Management 210 system comprises a repository to store contents (e.g., database 215) and allow access to these stored content items as and when required via the ECM. Frequently performed operations by users 201, 202 of the ECM system can comprise check-in and checkout operations, as well as operations utilizing content items stored in a database 215, such as using content items on published websites. The access permissions on content items can vary from Read, Write, Delete and Admin depending upon User privileges.

In accordance with an embodiment, a content management system, such as an enterprise content management system described above, can form part of a cloud-based content hub.

In accordance with an embodiment, a cloud-based content hub can allow users to manage content and digital assets via a network 205 connection (e.g., location independent). In addition, such a content hub allows users to store files in a cloud environment, allow access to such files no matter the location of a user.

In accordance with an embodiment, a cloud-based content hub can provide for easy-to-use collaboration and workflow management in order to streamline the creation and delivery of content to improve both customer and employee engagement.

In accordance with an embodiment, current website development and media access is centered more and more around content. Content is at the heart of almost all marketing and sales efforts. Users within a cloud-based content hub can share, collaborate, process, and manage content easily and effectively. Users can generally access such hubs via any network connected computer, tablet, or smartphone. Users can manage content just as if the content was residing on a local drive, and can add, deleted, and move files as needed within the hub. A cloud-based content hub can also be a place for collaboration, where a content creator might generate a piece to be published, pending approval by an editor. For example, if a picture needs to be approved before use on a website, an editor, or other user with sufficient credentials, can view it on (again, on any device), approve it, and move it through the design and publishing processes.

In accordance with an embodiment, a cloud-based content hub can additionally provide for sharing of individual files, and even entire folders with other users of the content hub, provided security and identify clearances have been managed. The content hub can additionally provide permissioned sharing, where a user uploading content to be shared can selectively share the content with only designated users. A could-based content hub can additionally provide for the sharing and joint development of websites and collections of digital assets, so other users have access to the content that's needed for a project.

In accordance with an embodiment, a cloud-based content hub can keep content synchronized between a user's local computer and the cloud. Users can install applications on their local devices that automatically keeps files synced across the cloud, and optionally, other user devices. Such sharing also contemplates the sharing of updates to documents, such as user generated content.

In accordance with an embodiment, users can utilize the cloud-based content hub to communicate with other users regarding files, folders, content items, or assets used in upcoming promotions, letting users post comments about it. Such files can also be modified via an annotation, highlighting a specific point and making a comment about it. As well, the cloud-based content hub can be utilized to have user discourse, such as a project lead allowing team members to exchange ideas about projects and processes. Then, files, such as content, can be added to such conversations, so that all participants can view, revise, suggest revisions, and comment on the content.

In accordance with an embodiment, a cloud-based content hub can be used for workflows. Workflows can be set up to funnel content to the appropriate people for approval and revision, eliminating bottlenecks in a process flow. Streamlined process management and content sharing mean more efficiency and less gaps in shared knowledge.

In accordance with an embodiment, a cloud-based content hub can be used for website creation, updating, and maintenance. Websites can be created and reviewed as needed with out-of-the-box templates and themes. Users can easily preview what a created site looks like on devices with different screen. For an optimal mobile experience, page content is automatically rearranged on smaller screens. Sites can use the most up-to-date information and assets to produce always-current material.

In accordance with an embodiment, users can manage all the assets needed for a website in one place and set up policies governing the use of those assets. This can allow website creators to use content and data from existing sources in an easy manner.

In accordance with an embodiment, a cloud-based content hub can be used to publish and update websites and make them available immediately. Users can work on one or more updates, preview an update in the site, and then publish the update with a single click.

In accordance with an embodiment, users can create content items, such as articles or blog posts or listings, and publish the items on a website or in a brochure or wherever they're needed. Different layouts mean that the content exists separately from the format, freeing users to update content as needed without worrying about how it will look or whether it will fit on the page.

Dynamic Site Compilation

In accordance with an embodiment, a cloud-based content hub can provide a visual website assembly tool for knowledge workers (i.e., non-technical users) to build sites through drag-and-drop of components onto pages. The user's actions in building a website can use metadata to define the page, which is then rendered dynamically at runtime.

In accordance with an embodiment, because the runtime pages are dynamically rendered, such websites can suffer from several performance issues, including but not limited to:

Delay on page start up to load up the page's meta-data before knowing what to render on the page.
Flash of un-styled content (FOUC) while the page waits for all CSS to load before being able to render.
Page animation (jumping) as components render at different speeds in different locations on the page
Additional server load by every client querying for resources that are not changing impact the overall page rendering speed.

In accordance with an embodiment, one solution to such problems involves server-side component rendering (on a per-request basis). When a request is made, a dynamic component is given the opportunity to "pre-render" into the page so that the initial view of the page is mostly what is required. Additional client-side hydration can then be applied to these pre-rendered components.

In accordance with an embodiment, another solution to such problems is static site generation (developer-centric). A site is created by a developer, who may use tools to compile a static version of the site. Another example is static site generation (non-technical user centric). Non-technical users building out the site using UI tools. During publishing of a website, the dynamic data is converted to runtime data and optimized for performance. In addition, there are JSP/PHP/ . . . per-request page generation tools that can be used for such purposes.

In accordance with an embodiment, however, the presently disclosed embodiment allows a non-technical user, as well as technical users, such as website developers, to "mark", or flag, various components of a website or page. One category of such marks or flags can then indicate that such items marked or flagged with this category can continue to be dynamic (i.e., dynamically rendered on website load or refresh), while another category of marks or flags can indicate items so marked to be fixed at compile time (e.g., static cache).

In accordance with an embodiment, the cost of complex content management system (CMS) queries can be eliminated in the running site by electing to have the component compiled into the page (static cache). The CMS query is then executed during compilation and results inserted directly into the compiled page. This results in far better user experience and allows for very large scalability by offloading repetitive calls to the CMS server.

Component Compilation

In accordance with an embodiment, the system allows developers to work with a variety of technologies and optimize a page or site for runtime performance. For example, during site development, a customer's component can be rendered with a framework such as VueJS, so that the component can be dynamically added to the page and updated. In accordance with an embodiment, the developer can create a custom (component) compiler, for use during compilation of a particular component, to convert the component to HTML/CSS so that it can be injected into the page without the use of JavaScript.

In accordance with an embodiment, the addition of offline site compilation can provide up to, and sometimes surpassing, a 400% gain in load speed up to the point where the page starts to render. This is achieved by reducing the initial page load to a single request rather than several request building up the page HTML before the page can start rendering. This removes any product introduced issues with flash of un-styled content (FOUC), allowing the template developer to have control over how/when the page appears. This enhances the experience of a user viewing the site as they navigate between pages in the site.

In accordance with an embodiment, for content-heavy pages, where such content can be defined at compile time, the page rendering is immediate or near-immediate instead of needing to wait for the content queries to return and be available on the page. Not only does this provide the user viewing the page in the browser with a much better experience, it also offloads all the queries from the content server. That load is paid once at compile, as opposed to on every single page request, resulting in much improved scalability.

Figure 3:
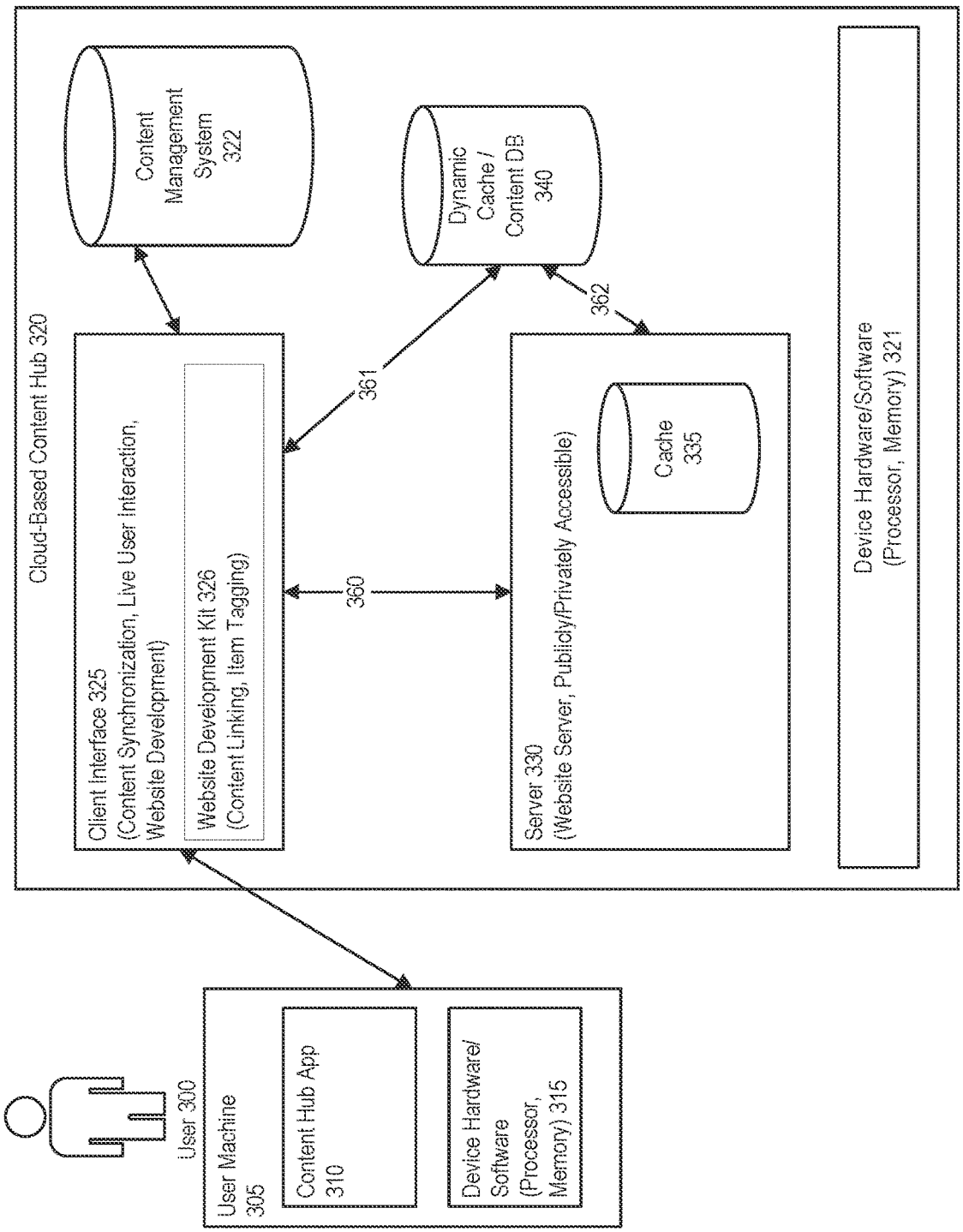
FIG. 3 shows a system for dynamic site compilation in a cloud-based content hub environment, in accordance with an embodiment.

FIG. 3 shows a system for dynamic site compilation in a cloud-based content hub environment, in accordance with an embodiment.

In accordance with an embodiment, a cloud-based content hub 320, which can be run on a number of hardware and software resources 321 (e.g., microprocessor, memory, storage, operation system . . . etc.), can comprise a client interface 325 (e.g., a graphical user interface, a command line interface, an application programming interface (API) . . . etc.), a content management system 322 (as described above), a server 330, and a dynamic cache 340. Although shown as being part of the cloud-based content hub, the server 330, the content management system 322, and the dynamic cache can be accessible by the content hub instead of being thought of as logically comprising first level components of the content hub.

In accordance with an embodiment, a client device or user machine 305, which can be accessed and utilized by user 300, can comprise device hardware (processor, memory . . . etc.) and software 315, as well as an application as content hub application 310, which can be used to communicate with the cloud-based content hub environment via a network, such as a wide area network (WAN), a local area network (LAN), or the internet, for example. The content-hub application can comprise a user interface, not shown.

In accordance with an embodiment, a user can utilize the content-hub application, and via the client interface 325, for example, upload content (e.g., user generated content such as articles, pictures, videos . . . etc.) to the content hub, at, for example, the content management system. Such upload and/or synchronization can be performed via a manual request, or via an automatic process that is signal by the content hub application, or by an instruction received from the client interface 325. The user may also utilize the content hub application and/or the client interface 325 to view, modify, edit, delete, or collaborate on content stored within the content management system, so long as the user has properly authenticated with the content hub (such authentication systems are not shown in FIG. 3).

In accordance with an embodiment, a user may also utilize a website development kit 326 of the client interface 325 to develop and publish a website via server 330. (The website developers kit, in other embodiments, may be standalone service offered by the content hub. For the sake of convenience, the kit 326 is shown as being part of the client interface in the presently described embodiment).

In accordance with an embodiment, as described above, the website development kit can provide a plurality of website templates, as well as the ability to drag and drop various items onto such templates, such that a non-technical user 300 can use the tools provided with ease. Examples of such development tools can be seen at FIGS. 10-16.

In accordance with an embodiment, the website development kit can provide a website pane in which, based upon received inputs, various pre-made templates and items can be placed (e.g., via drag and drop), onto a website template, which can then be, for example, previewed and/or published to the server 330 based upon received commands.

In accordance with an embodiment, because the website development kit can interact with the content management system, any items of content within the content management system that a user can access can also be provided as items which can be placed onto a website template. For example, if one member of a team is working on an article within the content management system, another member of the team can use such content in developing a website by placing an item comprising said content within a template provided by the website development kit.

In accordance with an embodiment, the website development kit can additionally provide an item tagging component that can received inputs from, for example, a user to tag certain items of a website as to be dynamically cached, while other items that are placed within a developing website can be tagged as static cache.

In accordance with an embodiment, then, items of content tagged as static can be stored at/compiled with a website at server 330 (e.g., stored in cache 335), such that on a load or refresh of the website, the server does not have to communicate with additional entities to gather the statically tagged content to be displayed or rendered on the website.

In accordance with an embodiment, items tagged as to be statically cached can be, on compiling the website, be stored 360 in a cache 335 at the server 330 where the website is compiled. Examples of items to be statically cached include items on a website that would not often change, as such items would only be allowed to change upon a re-compiling or re-publishing of a website, and not merely on a refresh of a webpage as performed by a viewer of the published website.

In accordance with an embodiment, items tagged as to be dynamically cached can be stored 361 at, for example the dynamic cache/website content database 340, or can be stored at the content management system 322. Examples of items to be statically cached include items on a website that are subject to frequent changes, as such items would be allowed to change on a refresh of a webpage as performed by a viewer of the published website. As an example, an article that is being revised and/or updated as a story develops. If such an article were being worked on within the content management system, a user, via the website development kit, could place an item within the subject website template that corresponds to said story, and tag the item as dynamic. Then, as the content is updated, the content on the published website is likewise updated 362 upon a refresh, or a push refresh, of the website at the server 330.

In accordance with an embodiment, items that are tagged to be dynamically cached can be fetched from either the content management system 322 or the dynamic cache 340 upon, for example, a load or a refresh of a website at server 330.

Figure 4:
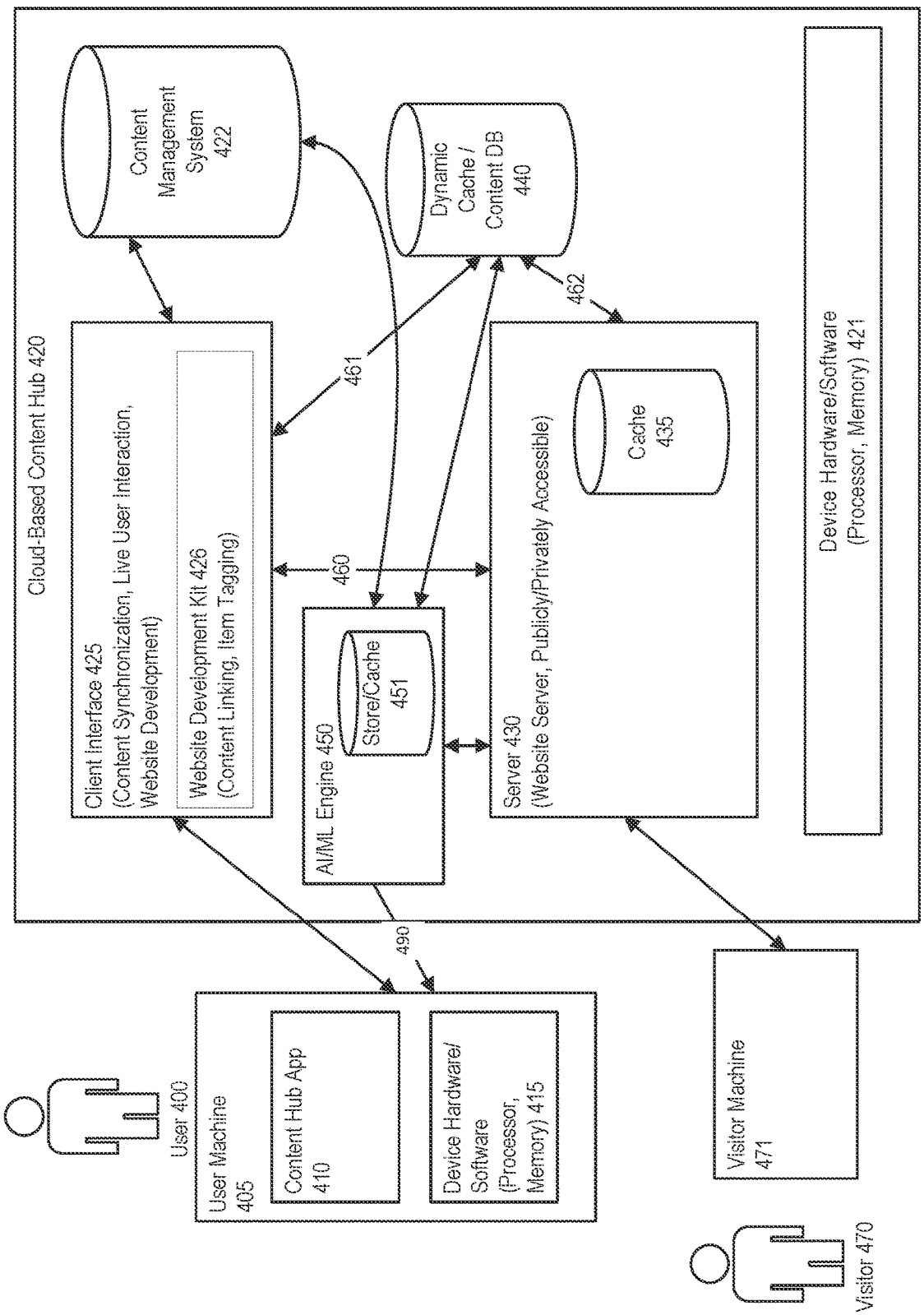
FIG. 4 shows a system for dynamic site compilation in a cloud-based content hub environment, in accordance with an embodiment.

FIG. 4 shows a system for dynamic site compilation in a cloud-based content hub environment, in accordance with an embodiment.

In accordance with an embodiment, a cloud-based content hub 420, which can be run on a number of hardware and software resources 421 (e.g., microprocessor, memory, storage, operation system . . . etc.), can comprise a client interface 425 (e.g., a graphical user interface, a command line interface, an application programming interface (API) . . . etc.), a content management system 422 (as described above), a server 430, a dynamic cache 440, and an artificial intelligence/machine learning (AI/ML) engine 450 and an associated store/cache 451, at which can be stored and updated a training database. Although shown as being part of the cloud-based content hub, the server 430, the content management system 422, and the dynamic cache can be accessible by the content hub instead of being thought of as logically comprising first level components of the content hub.

In accordance with an embodiment, a client device or user machine 405, which can be accessed and utilized by user 400, can comprise device hardware (processor, memory . . . etc.) and software 415, as well as an application as content hub application 410, which can be used to communicate with the cloud-based content hub environment via a network, such as a wide area network (WAN), a local area network (LAN), or the internet, for example. The content-hub application can comprise a user interface, not shown.

In accordance with an embodiment, a user can utilize the content-hub application, and via the client interface 425, for example, upload content (e.g., user generated content such as articles, pictures, videos . . . etc.) to the content hub, at, for example, the content management system. Such upload and/or synchronization can be performed via a manual request, or via an automatic process that is signal by the content hub application, or by an instruction received from the client interface 425. The user may also utilize the content hub application and/or the client interface 425 to view, modify, edit, delete, or collaborate on content stored within the content management system, so long as the user has properly authenticated with the content hub.

In accordance with an embodiment, a user may also utilize a website development kit 426 of the client interface 425 to develop and publish a website via server 430. (The website developers kit, in other embodiments, may be standalone service offered by the content hub. For the sake of convenience, the kit 426 is shown as being part of the client interface in the presently described embodiment).

In accordance with an embodiment, as described above, the website development kit can provide a plurality of website templates, as well as the ability to drag and drop various items onto such templates, such that a non-technical user 400 can use the tools provided with ease.

In accordance with an embodiment, the website development kit can provide a website pane in which, based upon received inputs, various pre-made templates and items can be placed (e.g., via drag and drop), onto a website template, which can then be, for example, previewed and/or published to the server 430 based upon received commands.

In accordance with an embodiment, because the website development kit can interact with the content management system, any items of content within the content management system 422 that a user can access can also be provided as items which can be placed (e.g., drag and drop) onto a website template. For example, if one member of a team is working on an article within the content management system, another member of the team can use such content in developing a website by placing an item comprising said content within a template provided by the website development kit.

In accordance with an embodiment, the website development kit can additionally provide an item tagging component that can received inputs from, for example, a user to tag certain items of a website as to be dynamically cached, while other items that are placed within a developing website can be tagged as static cache. Such a tag can comprise metadata attached to the content items.

In accordance with an embodiment, then, items of content tagged as static can be stored at/compiled with a website at server 430 (e.g., stored in cache 435), such that on a load or refresh of the website, the server does not have to communicate with additional entities to gather the statically tagged content to be displayed or rendered on the website. In this way, a visitor to a website 470, utilizing a visitor machine 471, can view and interact with the website. On load or refresh of the website, items that are statically tagged will load faster than those that are dynamically fetched on load/refresh.

In accordance with an embodiment, items tagged as to be dynamically cached can be stored 461 at, for example the dynamic cache/website content database 440, or can be stored at the content management system 422. Examples of items to be statically cached include items on a website that are subject to frequent changes, as such items would be allowed to change on a refresh of a webpage as performed by a viewer of the published website. As an example, an article that is being revised and/or updated as a story develops. If such an article were being worked on within the content management system, a user, via the website development kit, could place an item within the subject website template that corresponds to said story, and tag the item as dynamic. Then, as the content is updated, the content on the published website is likewise updated 462 upon a refresh, or a push refresh, of the website at the server 430.

In accordance with an embodiment, items that are tagged to be dynamically cached can be fetched from either the content management system 422 or the dynamic cache 440 upon, for example, a load or a refresh of a website at server 430, e.g., from a visitor 470 via a visitor machine 471 viewing or loading the website compiled at the server 430.

In accordance with an embodiment, items tagged as to be statically cached can be, on compiling the website, be stored 460 in a cache 435 at the server 430 where the website is compiled. Examples of items to be statically cached include items on a website that would not often change, as such items would only be allowed to change upon a re-compiling or re-publishing of a website, and not merely on a refresh of a webpage as performed by a viewer of the published website.

In accordance with an embodiment, items tagged as to be dynamically cached can be stored 461 at, for example the dynamic cache/website content database 440, or can be stored at the content management system 422. Examples of items to be statically cached include items on a website that are subject to frequent changes, as such items would be allowed to change on a refresh of a webpage as performed by a viewer of the published website. As an example, an article that is being revised and/or updated as a story develops. If such an article were being worked on within the content management system, a user, via the website development kit, could place an item within the subject website template that corresponds to said story, and tag the item as dynamic. Then, as the content is updated, the content on the published website is likewise updated 462 upon a refresh, or a push refresh, of the website at the server 430.

In accordance with an embodiment, the AI/ML engine 450 can monitor and track, via a content analytics engine (also referred to herein as an analytics engine) of the AI/ML engine, the content analytics engine utilizing a knowledge database at a cache 435, the lifecycle of content published at a website hosted at server 430. The metrics that can be tracked by the content analytics engine can include, for example, the frequency of publication (i.e., website loads or refreshes of pages containing the content items). The metrics that can be tracked by the content analytics engine can additionally include, for example, the rate of change of each content item published on the website (whether the items are tagged static or dynamic). This tracking can be performed by monitoring both the website at the server at its associated cache 435, and can additionally include monitoring the content management system and the dynamical cache, for, e.g., the rate of updates to content items at, for example, the content management system 422 as well as dynamic cache 440. Additional metrics that can be tracked by a content analytics engine of the AI/ML engine can include monitoring the usage/viewing of content (e.g., the pervasiveness of usage) of the content, both at the website (e.g., by viewer 470), as well as the individual usage of content items at the content management system 422, the dynamic cache 440, and the cache 435 of the server.

In accordance with an embodiment, such analytics engine can gather information regarding, for example, popular pages of the published website, popular content, pages where viewers spent the most time . . . etc.

Automatic Suggestion of Content Based on Analytics

In accordance with an embodiment, the AI/ML engine, based upon the monitored metrics associated with content items, can provide one or more suggestions 490 to a user 400, e.g., via the user machine 405, regarding which items of content would be most effective to be tagged as static, and which items of content would be most effective to be tagged as dynamic.

Figure 5:
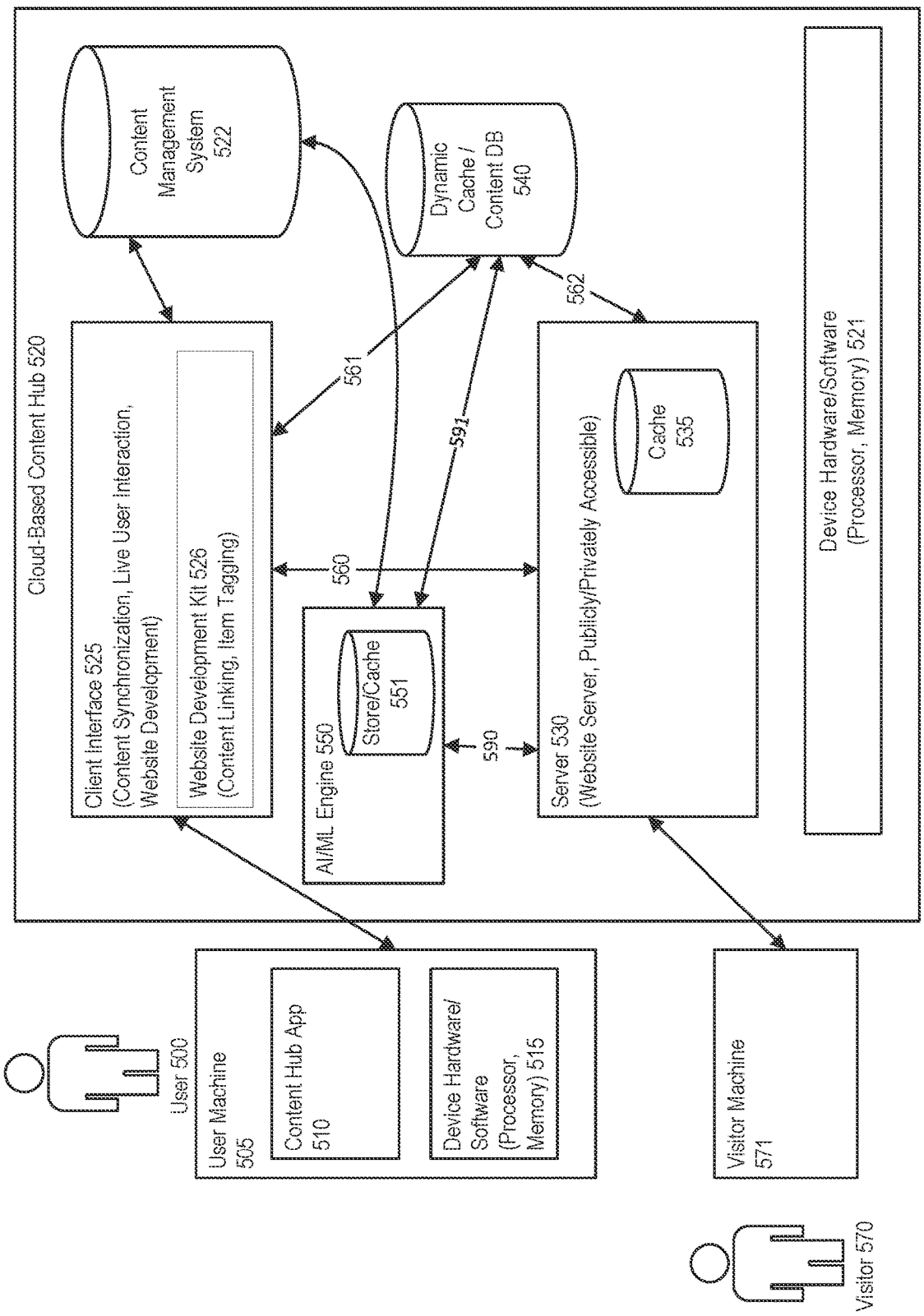
FIG. 5 shows a system for dynamic site compilation in a cloud-based content hub environment, in accordance with an embodiment.

FIG. 5 shows a system for dynamic site compilation in a cloud-based content hub environment, in accordance with an embodiment.

In accordance with an embodiment, a cloud-based content hub 520, which can be run on a number of hardware and software resources 521 (e.g., microprocessor, memory, storage, operation system . . . etc.), can comprise a client interface 525 (e.g., a graphical user interface, a command line interface, an application programming interface (API) . . . etc.), a content management system 522 (as described above), a server 530, a dynamic cache 540, and an artificial intelligence/machine learning (AI/ML) engine 550 and an associated store/cache 551, at which can be stored and updated a training database. Although shown as being part of the cloud-based content hub, the server 530, the content management system 522, and the dynamic cache can be accessible by the content hub instead of being thought of as logically comprising first level components of the content hub.

In accordance with an embodiment, a client device or user machine 505, which can be accessed and utilized by user 500, can comprise device hardware (processor, memory . . . etc.) and software 515, as well as an application as content hub application 510, which can be used to communicate with the cloud-based content hub environment via a network, such as a wide area network (WAN), a local area network (LAN), or the internet, for example. The content-hub application can comprise a user interface, not shown.

In accordance with an embodiment, a user can utilize the content-hub application, and via the client interface 525, for example, upload content (e.g., user generated content such as articles, pictures, videos . . . etc.) to the content hub, at, for example, the content management system. Such upload and/or synchronization can be performed via a manual request, or via an automatic process that is signal by the content hub application, or by an instruction received from the client interface 525. The user may also utilize the content hub application and/or the client interface 525 to view, modify, edit, delete, or collaborate on content stored within the content management system, so long as the user has properly authenticated with the content hub.

In accordance with an embodiment, a user may also utilize a website development kit 526 of the client interface 525 to develop and publish a website via server 530. (The website developers kit, in other embodiments, may be standalone service offered by the content hub. For the sake of convenience, the kit 526 is shown as being part of the client interface in the presently described embodiment).

In accordance with an embodiment, as described above, the website development kit can provide a plurality of website templates, as well as the ability to drag and drop various items onto such templates, such that a non-technical user 500 can use the tools provided with ease.

In accordance with an embodiment, the website development kit can provide a website pane in which, based upon received inputs, various pre-made templates and items can be placed (e.g., via drag and drop), onto a website template, which can then be, for example, previewed and/or published to the server 530 based upon received commands.

In accordance with an embodiment, because the website development kit can interact with the content management system, any items of content within the content management system 522 that a user can access can also be provided as items which can be placed (e.g., drag and drop) onto a website template. For example, if one member of a team is working on an article within the content management system, another member of the team can use such content in developing a website by placing an item comprising said content within a template provided by the website development kit.

In accordance with an embodiment, the website development kit can additionally provide an item tagging component that can received inputs from, for example, a user to tag certain items of a website as to be dynamically cached, while other items that are placed within a developing website can be tagged as static cache. Such a tag can comprise metadata attached to the content items.

In accordance with an embodiment, then, items of content tagged as static can be stored at/compiled with a website at server 530 (e.g., stored in cache 535), such that on a load or refresh of the website, the server does not have to communicate with additional entities to gather the statically tagged content to be displayed or rendered on the website. In this way, a visitor to a website 570, utilizing a visitor machine 571, can view and interact with the website. On load or refresh of the website, items that are statically tagged will load faster than those that are dynamically fetched on load/refresh.

In accordance with an embodiment, items tagged as to be dynamically cached can be stored 561 at, for example the dynamic cache/website content database 540, or can be stored at the content management system 522. Examples of items to be statically cached include items on a website that are subject to frequent changes, as such items would be allowed to change on a refresh of a webpage as performed by a viewer of the published website. As an example, an article that is being revised and/or updated as a story develops. If such an article were being worked on within the content management system, a user, via the website development kit, could place an item within the subject website template that corresponds to said story, and tag the item as dynamic. Then, as the content is updated, the content on the published website is likewise updated 562 upon a refresh, or a push refresh, of the website at the server 530.

In accordance with an embodiment, items that are tagged to be dynamically cached can be fetched from either the content management system 522 or the dynamic cache 540 upon, for example, a load or a refresh of a website at server 530, e.g., from a visitor 570 via a visitor machine 571 viewing or loading the website compiled at the server 530.

In accordance with an embodiment, items tagged as to be statically cached can be, on compiling the website, be stored 560 in a cache 535 at the server 530 where the website is compiled. Examples of items to be statically cached include items on a website that would not often change, as such items would only be allowed to change upon a re-compiling or re-publishing of a website, and not merely on a refresh of a webpage as performed by a viewer of the published website.

In accordance with an embodiment, items tagged as to be dynamically cached can be stored 561 at, for example the dynamic cache/website content database 540, or can be stored at the content management system 522. Examples of items to be statically cached include items on a website that are subject to frequent changes, as such items would be allowed to change on a refresh of a webpage as performed by a viewer of the published website. As an example, an article that is being revised and/or updated as a story develops. If such an article were being worked on within the content management system, a user, via the website development kit, could place an item within the subject website template that corresponds to said story, and tag the item as dynamic. Then, as the content is updated, the content on the published website is likewise updated 562 upon a refresh, or a push refresh, of the website at the server 530.

In accordance with an embodiment, the AI/ML engine 550 can monitor and track, via a content analytics engine of the AI/ML engine, the content analytics engine utilizing a knowledge database at a cached 535, the lifecycle of content published at a website hosted at server 530. The metrics that can be tracked by the content analytics engine can include, for example, the frequency of publication (i.e., website loads or refreshes of pages containing the content items). The metrics that can be tracked by the content analytics engine can additionally include, for example, the rate of change of each content item published on the website (whether the items are tagged static or dynamic). This tracking can be performed by monitoring both the website at the server at its associated cache 535, and can additionally include monitoring the content management system and the dynamical cache, for, e.g., the rate of updates to content items at, for example, the content management system 522 as well as dynamic cache 540. Additional metrics that can be tracked by a content analytics engine of the AI/ML engine can include monitoring the usage/viewing of content (e.g., the pervasiveness of usage) of the content, both at the website (e.g., by viewer 570), as well as the individual usage of content items at the content management system 522, the dynamic cache 540, and the cache 535 of the server.

In accordance with an embodiment, such analytics engine can gather information regarding, for example, popular pages of the published website, popular content, pages where viewers spent the most time . . . etc.

In accordance with an embodiment, the AI/ML engine, based upon the monitored metrics associated with content items, can automatically mark certain content as static 590 (i.e., compiled along with the website and stored in cache 535), and can automatically mark certain other content as dynamic 591 (i.e., to be stored in a dynamic cache 540, or at the content management system 522). Such automatic tagging of content items as either static or dynamic can be made upon a determination, by a content analytics engine (of the AI/ML engine) regarding which items of content would be most effective to be tagged as dynamic and which content items would be most effective as being tagged static.

Figure 6:
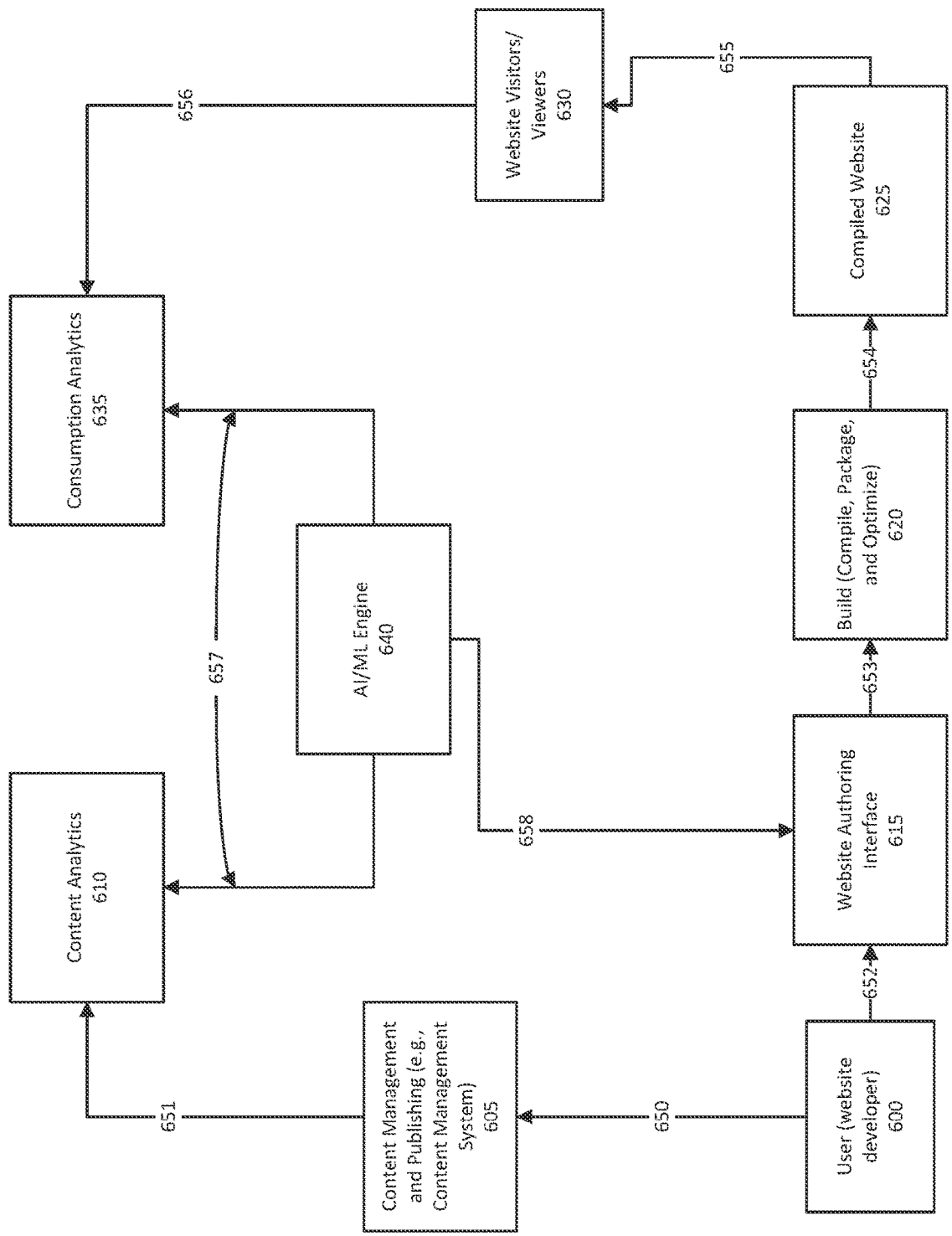
FIG. 6 shows a flowchart of a suggestion engine and automatic tagging engine for use in dynamic site compilation in a cloud-based content hub environment, in accordance with an embodiment.

FIG. 6 shows a flowchart of a suggestion engine for use in dynamic site compilation in a cloud-based content hub environment, in accordance with an embodiment.

In accordance with an embodiment, as discussed above, the website development kit discussed above can work in conjunction with a suggestion and automatic tagging engine to be used in tagging various website elements as dynamic or static.

In accordance with an embodiment, at step 650, content authors, such as user 600, can manage and publish content to a cloud-based content hub, via, for example, a client interface. Such content can be managed and published at a content management and publishing system 605, which, for example, can comprise a content management system as described above.

In accordance with an embodiment, at step 651, via a content analytics engine 640, which can be based upon, for example, artificial intelligence and machine learning via a knowledge database, can track the published content's lifecycle analytics 610. Such tracking metrics can include the frequency of publication, the rate of change of the content, content categorization, scheduled publish activity, and similarity with other qualified content (e.g., content that previously went through static complication).

In accordance with an embodiment, at step 652, content authors, such as user 600, can utilize a website authoring interface 615, such as the website development kit, in order to design and build a website via, for example, supplied website templates and drag and drop functionality to place various items, including published content from step 650, to a draft website.

In accordance with an embodiment, at step 653, the user 600 can build 620 (e.g., compile, package, and optimize) a website, prior to publication (before the website is made available to public viewing, or internal viewing by others with allowed access). Such website can be, for example, previewed by the author, then revised, and previewed again.

In accordance with an embodiment, at step 654, the website can be published (as a compiled website 625) to a, for example, publicly accessible server, which can be accessed 655 by website viewers 630. As described above, the compiled website 625 can comprise both content that is both tagged as static (e.g., content items compiled with the website as static content and not fetched from an alternative source on website load/refresh) or dynamic content (e.g., content items not compiled with the website as static content and are rather fetched from an alternative source, such as a content management system 605 or a dynamic cache, on website load/refresh).

In accordance with an embodiment, a consumption analytics engine 635 can, at step 656, gather website visitor/ website behavior with respect to the website as the website viewers 640 interact with the published website. Such analytics engine can gather information regarding, for example, popular web pages, popular content on a web page, engagement (time spent on page/content, repeated views by same user, bounce rate), direct access pages (e.g., direct page access from, e.g., a search engine result), custom conversions.

In accordance with an embodiment, at step 657, an Artificial Intelligence/Machine Learning tag engine 640 can monitor the collected analytics from steps 651 and 656 in order to produce recommendations 658 regarding tagging (static versus dynamic) decisions. The engine 640 can be associated with a knowledge database (not shown) that can comprise a set of seed data, and which can be built upon based upon metrics analyzed, as well as an analysis of the accuracy of the output of the engine 640.

In accordance with an embodiment, the engine 640 can present optimized tagging suggestions/recommendations to a site author at step 658 (e.g., via the website authoring interface 615).

In accordance with an embodiment, the AI/ML engine constantly monitors both content analytics as well as consumption analytics. Thus, the engine 640 is capable of revising and changing prior tag suggestions/decisions based upon the analysis of subsequent metrics (metrics produced after an initial tag suggestion/decision).

In accordance with an embodiment, the AI/ML engine can perform an analysis such as the example illustrated below:

Content Qualification Metrics:
1. Frequency of publication ($CQ_{w1}$)
2. Rate of change of content ($CQ_{w2}$)
3. Content categorization ($CQ_{w3}$)
4. Schedule publish activity ($CQ_{w4}$)
5. Similarity with other qualified content (content that previously went through static compilation) ($CQ_{w5}$)
==Content Qualification (CQ)=fn ($CQ_{w1}$, $CQ_{w2}$, $CQ_{w3}$, $CQ_{w4}$, $CQ_{w5}$)

Usage Qualification Metrics:
1. Popular pages ($UQ_{w1}$)
2. Popular content ($UQ_{w2}$)
3. Engagement (time spent on page/content, repeated views by same user, bounce rate) ($UQ_{w3}$)

4. Direct access pages (e.g., direct page access from, e.g., a search engine result) (UQw4)
5. Custom conversions (UQw5)
==Usage Qualification (UQ)=fn (UQw1, UQw2, UQw3, UQw4, UQw5)

Wherein the AI/ML Engine Performs a Process:
1. For each content item in the system:
   a. Compute CQ and UQ continuously.
2. Periodically compute:
   a. Generate a list of top candidates (content items) for static compilation.
   b. Suggest/automatically tag for static compilation based on generated list of top candidates.

Automatic Selection of Content Based on Analytics

Figure 7:
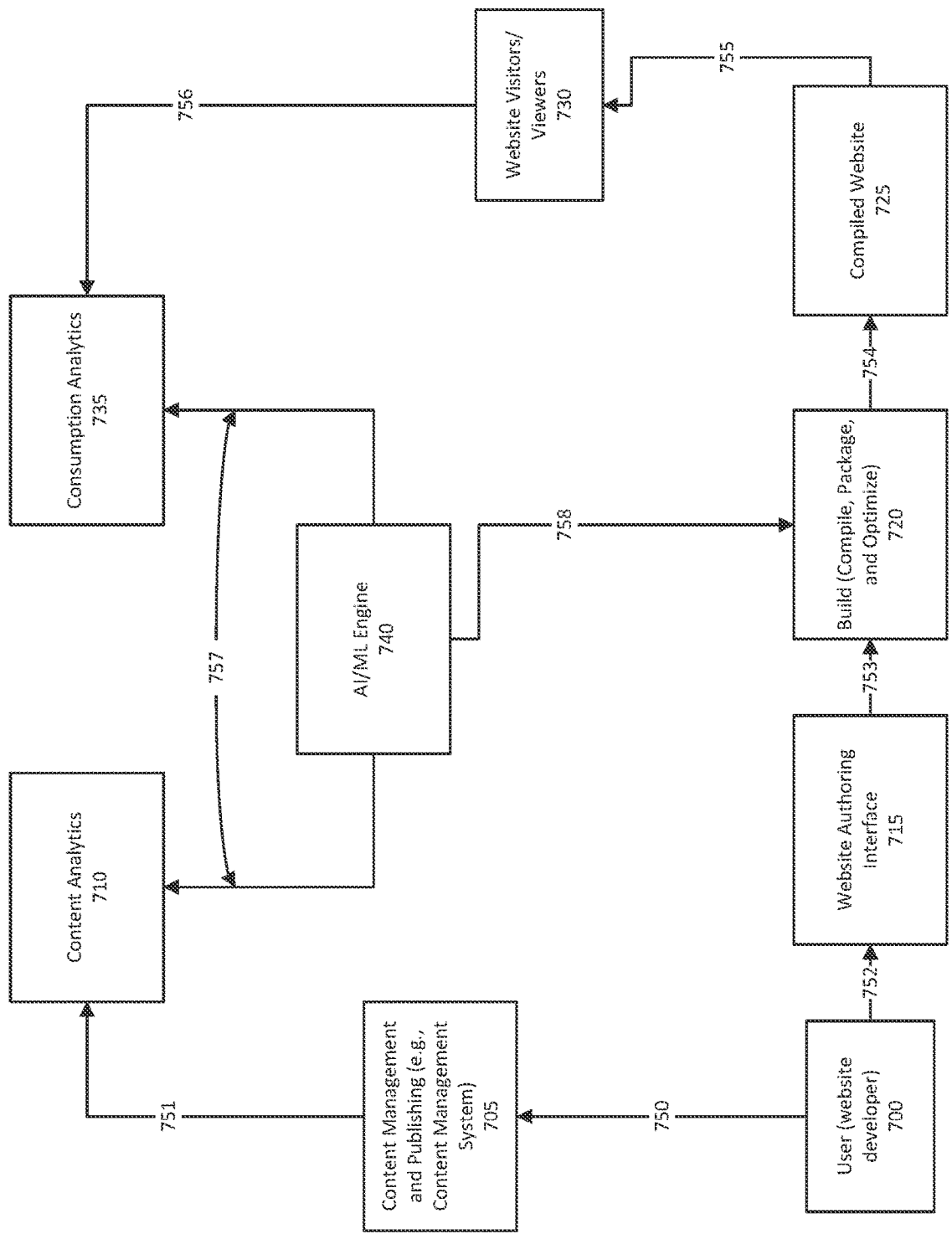
FIG. 7 shows a flowchart of a suggestion engine and automatic tagging engine for use in dynamic site compilation in a cloud-based content hub environment, in accordance with an embodiment.

FIG. 7 shows a flowchart of an automatic tagging engine for use in dynamic site compilation in a cloud-based content hub environment, in accordance with an embodiment.

In accordance with an embodiment, as discussed above, the website development kit discussed above can work in conjunction with a suggestion and automatic tagging engine to be used in tagging various website elements as dynamic or static.

In accordance with an embodiment, at step 750, content authors, such as user 700, can manage and publish content to a cloud-based content hub, via, for example, a client interface. Such content can be managed and published at a content management and publishing system 705, which, for example, can comprise a content management system as described above.

In accordance with an embodiment, at step 751, via a content analytics engine 740, which can be based upon, for example, artificial intelligence and machine learning via a knowledge database, can track the published content's lifecycle analytics 710. Such tracking metrics can include the frequency of publication, the rate of change of the content, and the pervasiveness of usage of the content.

In accordance with an embodiment, at step 752, content authors, such as user 700, can utilize a website authoring interface 715, such as the website development kit, in order to design and build a website via, for example, supplied website templates and drag and drop functionality to place various items, including published content from step 750, to a draft website.

In accordance with an embodiment, at step 753, the user 700 can build 720 (e.g., compile, package, and optimize) a website, prior to publication (before the website is made available to public viewing, or internal viewing by others with allowed access). Such website can be, for example, previewed by the author, then revised, and previewed again.

In accordance with an embodiment, at step 754, the website can be published (as a compiled website 725) to a, for example, publicly accessible server, which can be accessed 755 by website viewers 730. As described above, the compiled website 725 can comprise both content that is both tagged as static (e.g., content items compiled with the website as static content and not fetched from an alternative source on website load/refresh) or dynamic content (e.g., content items not compiled with the website as static content and are rather fetched from an alternative source, such as a content management system 705 or a dynamic cache, on website load/refresh).

In accordance with an embodiment, a consumption analytics engine 735 can, at step 756, gather website visitor/website behavior with respect to the website as the website viewers 740 interact with the published website. Such analytics engine can gather information regarding, for example, popular pages of the published website, popular content, pages where viewers spent the most time . . . etc.

In accordance with an embodiment, at step 757, an Artificial Intelligence/Machine Learning tag engine 740 can monitor the collected analytics from steps 751 and 756 in order to automatically tag 758 certain items of content as static or dynamic upon building a website. In this way, as opposed to presenting options to a user 700 with regard to what items of content should be tagged as static or dynamic, the engine 740 can itself make the decisions, thus simplifying the website designing and building process for the user 700. The engine 740 can be associated with a knowledge database (not shown) that can comprise a set of seed data, and which can be built upon based upon metrics analyzed, as well as an analysis of the accuracy of the output of the engine 740.

In accordance with an embodiment, the engine 740 can, based upon a determination made as to the benefits of tagging one, some, or all items of content as either static or dynamic, make such tagging decisions and automatically select a tag, based upon its analysis, of various items on a website, and compile the components into the website at step 758.

In accordance with an embodiment, the AI/ML engine constantly monitors both content analytics as well as consumption analytics. Thus, the engine 740 is capable of revising and changing prior tag suggestions/decisions based upon the analysis of subsequent metrics (metrics produced after an initial tag suggestion/decision).

Figure 8:
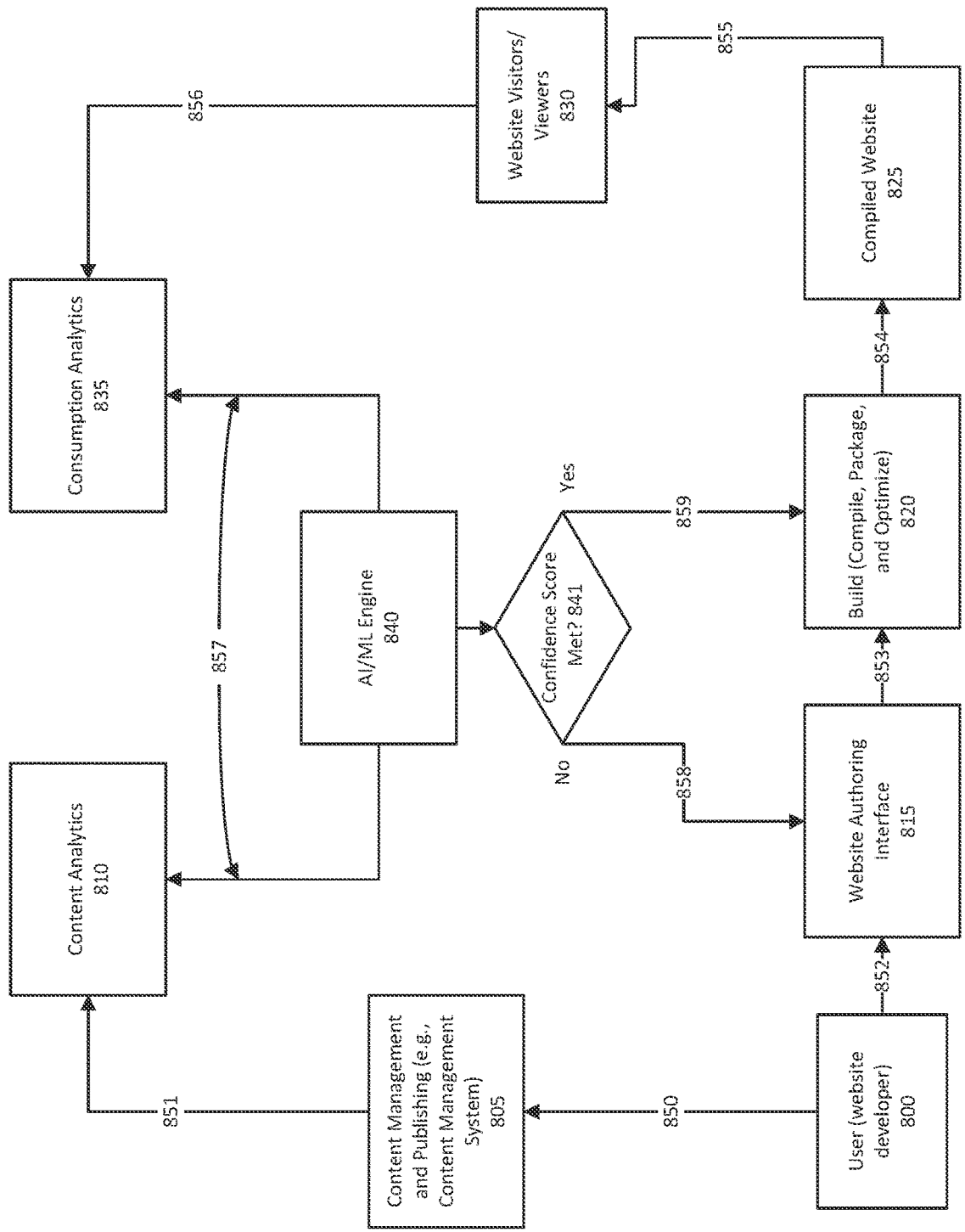
FIG. 8 shows a flowchart of a suggestion engine and automatic tagging engine for use in dynamic site compilation in a cloud-based content hub environment, in accordance with an embodiment.

FIG. 8 shows a flowchart of an automatic tagging engine for use in dynamic site compilation in a cloud-based content hub environment, in accordance with an embodiment.

In accordance with an embodiment, as discussed above, the website development kit discussed above can work in conjunction with a suggestion and automatic tagging engine to be used in tagging various website elements as dynamic or static.

In accordance with an embodiment, at step 850, content authors, such as user 800, can manage and publish content to a cloud-based content hub, via, for example, a client interface. Such content can be managed and published at a content management and publishing system 805, which, for example, can comprise a content management system as described above.

In accordance with an embodiment, at step 851, via a content analytics engine 840, which can be based upon, for example, artificial intelligence and machine learning via a knowledge database, can track the published content's lifecycle analytics 810. Such tracking metrics can include the frequency of publication, the rate of change of the content, and the pervasiveness of usage of the content.

In accordance with an embodiment, at step 852, content authors, such as user 800, can utilize a website authoring interface 815, such as the website development kit, in order to design and build a website via, for example, supplied website templates and drag and drop functionality to place various items, including published content from step 850, to a draft website.

In accordance with an embodiment, at step 853, the user 800 can build 820 (e.g., compile, package, and optimize) a website, prior to publication (before the website is made available to public viewing, or internal viewing by others with allowed access). Such website can be, for example, previewed by the author, then revised, and previewed again.

In accordance with an embodiment, at step 854, the website can be published (as a compiled website 825) to a, for example, publicly accessible server, which can be accessed 855 by website viewers 830. As described above, the compiled website 825 can comprise both content that is both tagged as static (e.g., content items compiled with the website as static content and not fetched from an alternative source on website load/refresh) or dynamic content (e.g., content items not compiled with the website as static content and are rather fetched from an alternative source, such as a content management system 805 or a dynamic cache, on website load/refresh).

In accordance with an embodiment, a consumption analytics engine 835 can, at step 856, gather website visitor/website behavior with respect to the website as the website viewers 840 interact with the published website. Such analytics engine can gather information regarding, for example, popular pages of the published website, popular content, pages where viewers spent the most time . . . etc.

In accordance with an embodiment, at step 857, an Artificial Intelligence/Machine Learning tag engine 840 can monitor the collected analytics from steps 851 and 856 in order to automatically tag 858 certain items of content as static or dynamic upon building a website. In this way, as opposed to presenting options to a user 800 with regard to what items of content should be tagged as static or dynamic, the engine 840 can itself make the decisions, thus simplifying the website designing and building process for the user 800. The engine 840 can be associated with a knowledge database (not shown) that can comprise a set of seed data, and which can be built upon based upon metrics analyzed, as well as an analysis of the accuracy of the output of the engine 840.

In accordance with an embodiment, a user can set the engine 840 with a variable confidence score index, where any tag suggestions below a set confidence score can be provided to a user, at step 858, to make a static/dynamic content tagging decision upon the confidence score not being met at 841. Upon a confidence score being met, at 841, the engine 840 can automatically make the tagging decision 859, and such content can automatically be built into the website without user approval.

In accordance with an embodiment, the AI/ML engine constantly monitors both content analytics as well as consumption analytics. Thus, the engine 840 is capable of revising and changing prior tag suggestions/decisions based upon the analysis of subsequent metrics (metrics produced after an initial tag suggestion/decision).

Figure 9:
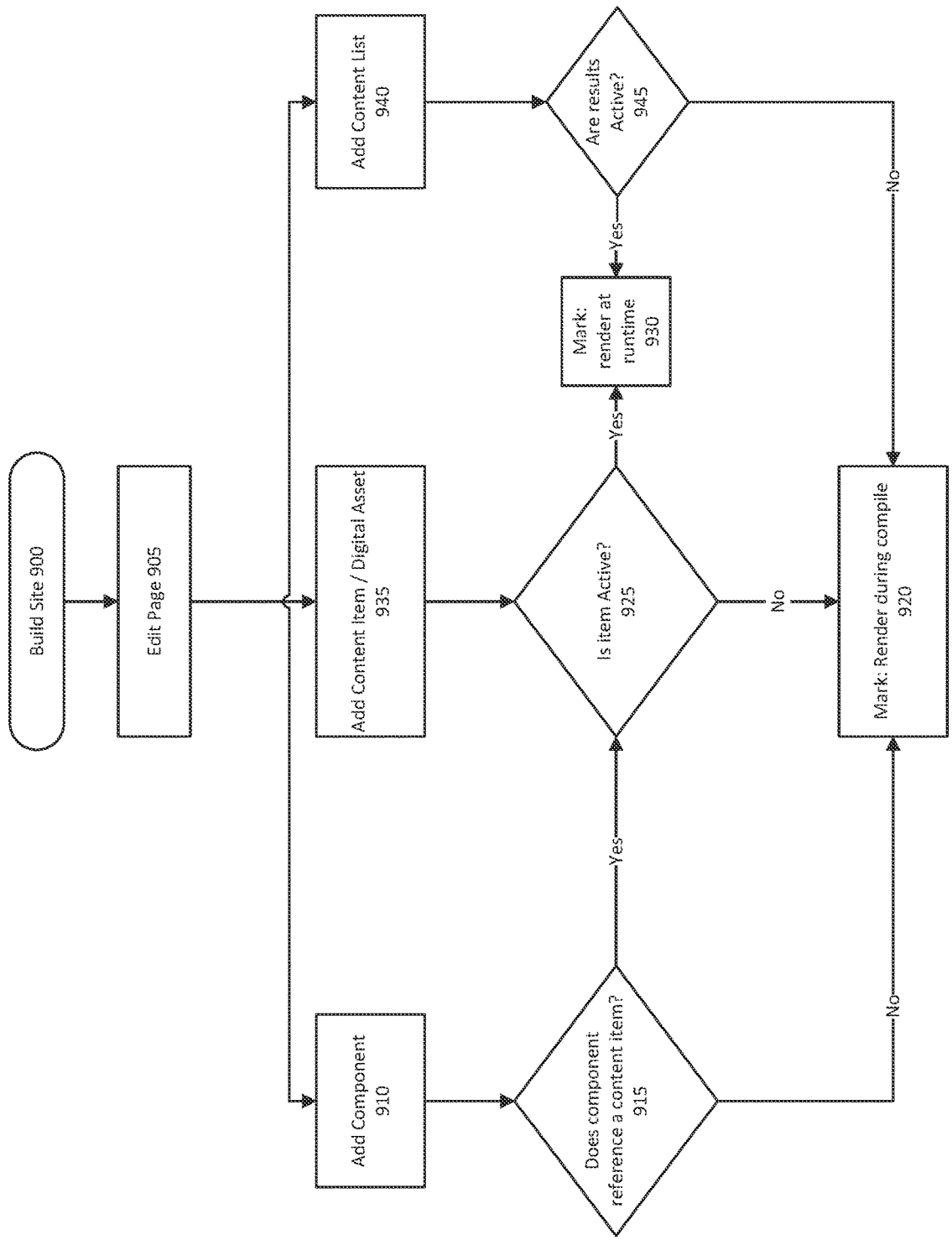
FIG. 9 is a flowchart of a method for a suggestion engine and automatic tagging engine for use in dynamic site compilation in a cloud-based content hub environment, in accordance with an embodiment.

FIG. 9 is a flowchart of a method for an automatic tagging engine for use in dynamic site compilation in a cloud-based content hub environment, in accordance with an embodiment.

In accordance with an embodiment, a site can be built and published at 900. At 905, the site can be edited (or a page of the site).

In accordance with an embodiment, at 910, if the edit involves adding a component to the website, it can be checked at 915 whether the component references a piece of content, such as from a content management system of the cloud-based content hub. If not, then at 320, the item can be tagged, or suggested to be tagged as to render during compile of the website (static cache).

In accordance with an embodiment, if the component does reference a content item, then the method can check, at 925, whether the content item is active. If not, then at 920, the item can be tagged, or suggested to be tagged as to render during compile of the website (static cache). If so, then at 930, the item can be tagged, or suggested to be tagged, as to render the item at runtime (dynamic cache).

In accordance with an embodiment, at 935, if the edit involves adding a content item or digital asset, then the method can check, at 925, whether the content item is active. If not, then at 920, the item can be tagged, or suggested to be tagged as to render during compile of the website (static cache). If so, then at 930, the item can be tagged, or suggested to be tagged, as to render the item at runtime (dynamic cache).

In accordance with an embodiment, at 940, if the edit involves adding a content list to the website, it can be checked at 945 whether the results of the content list are active. If not, then at 920, the item can be tagged, or suggested to be tagged as to render during compile of the website (static cache).

In accordance with an embodiment, if the results of the content list are active, then at 930, the item can be tagged, or suggested to be tagged, as to render the item at runtime (dynamic cache).

User Interface

Figure 10:
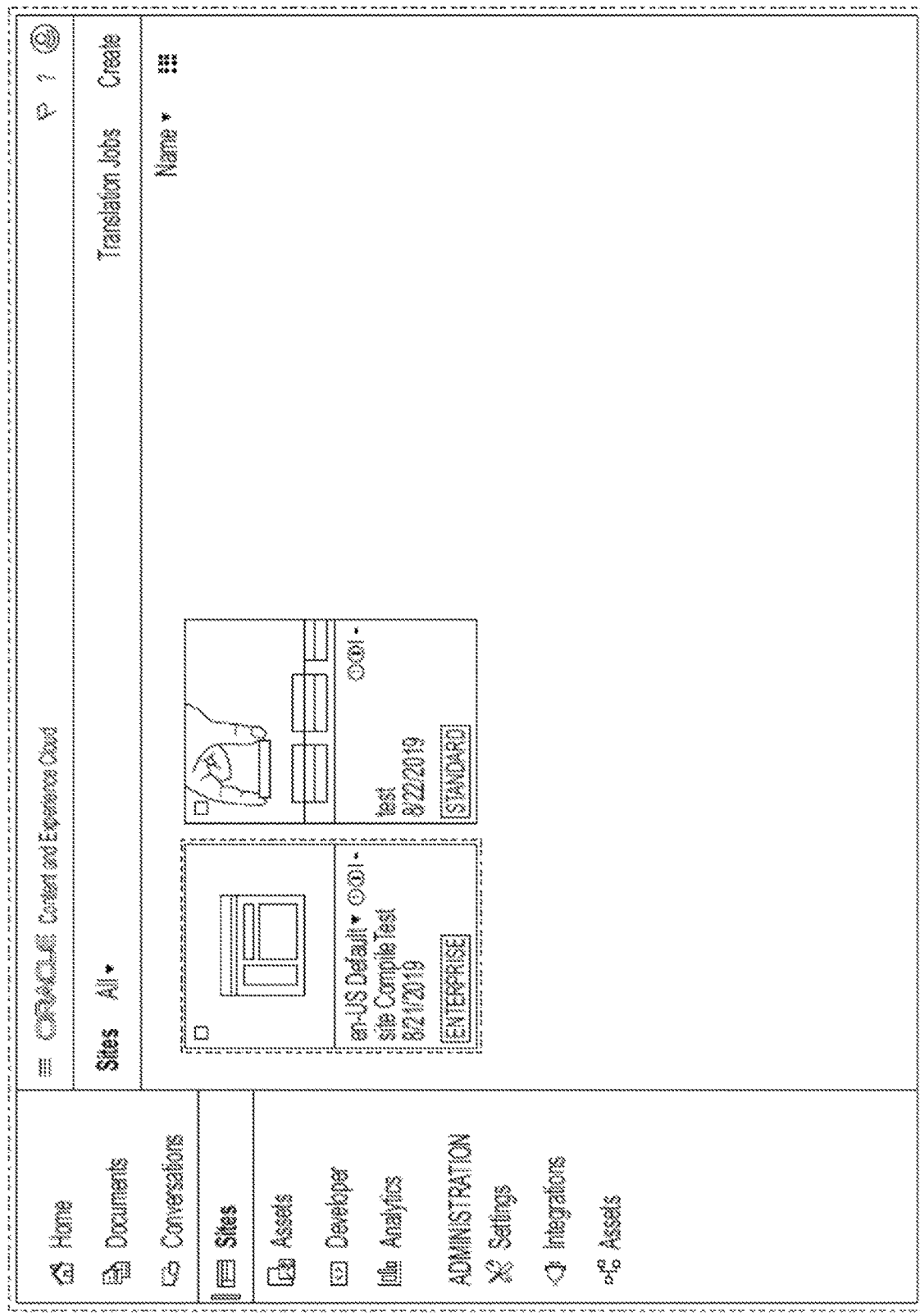
FIG. 10 is a screen shot of an exemplary website design portal/toolkit as provided in a cloud-based content hub, in accordance with an embodiment.

FIG. 10 is a screen shot of an exemplary website design portal/toolkit as provided in a cloud-based content hub, in accordance with an embodiment.

More particularly, FIG. 10 shows is a screenshot of an exemplary website design portal/toolkit as provided in a cloud-based content hub showing a plurality of site template options, in accordance with an embodiment.

Figure 11:
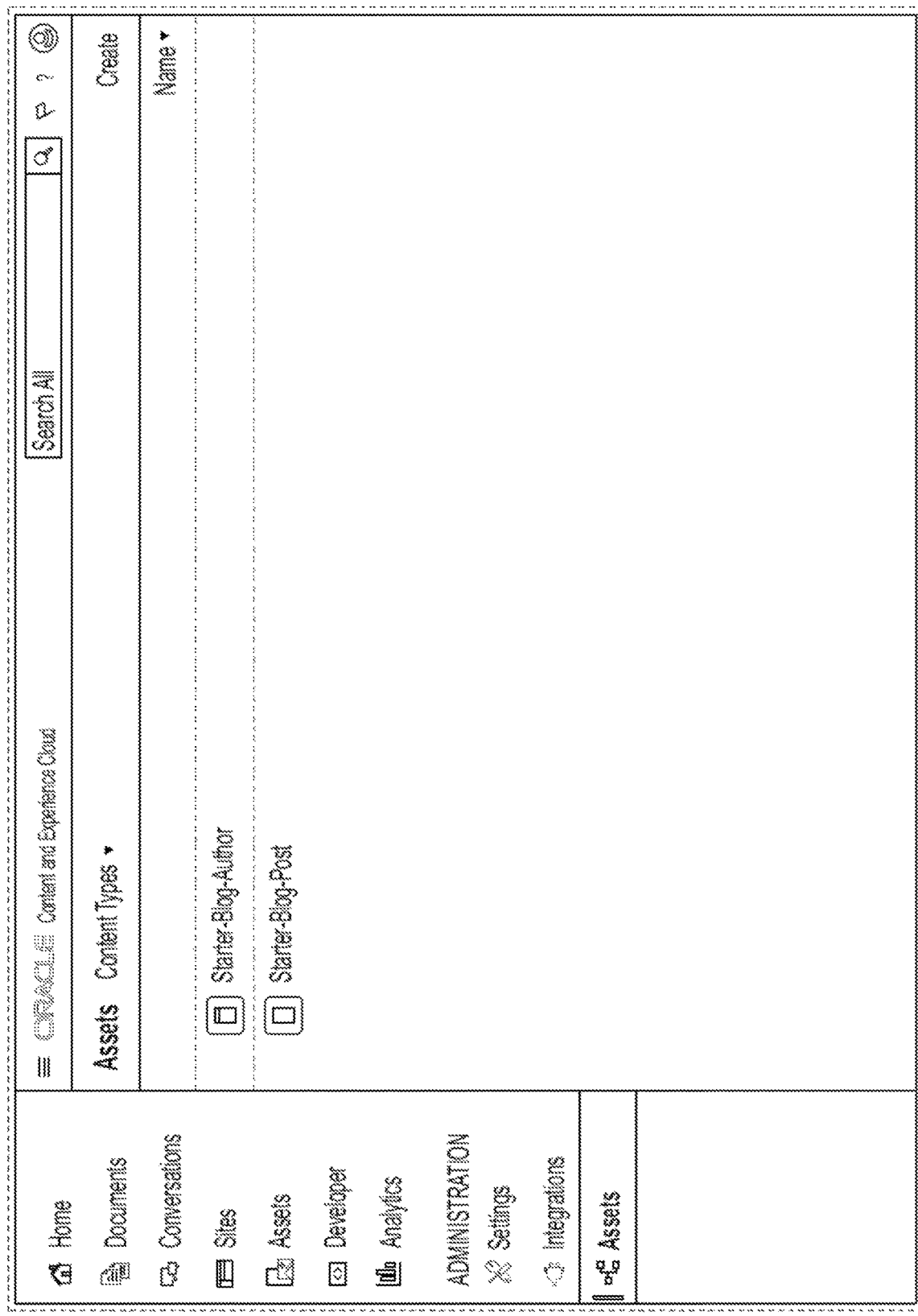
FIG. 11 is a screen shot of an exemplary website design portal/toolkit as provided in a cloud-based content hub, in accordance with an embodiment.

FIG. 11 is a screen shot of an exemplary website design portal/toolkit as provided in a cloud-based content hub, in accordance with an embodiment.

More particularly, FIG. 11 is a screen shot of exemplary website design portal/toolkit as provided in a cloud-based content hub showing a plurality of content assets that can be used within a designed website, in accordance with an embodiment. Such content assets can, for example, be stored at a content management system, as described above.

Figure 12:
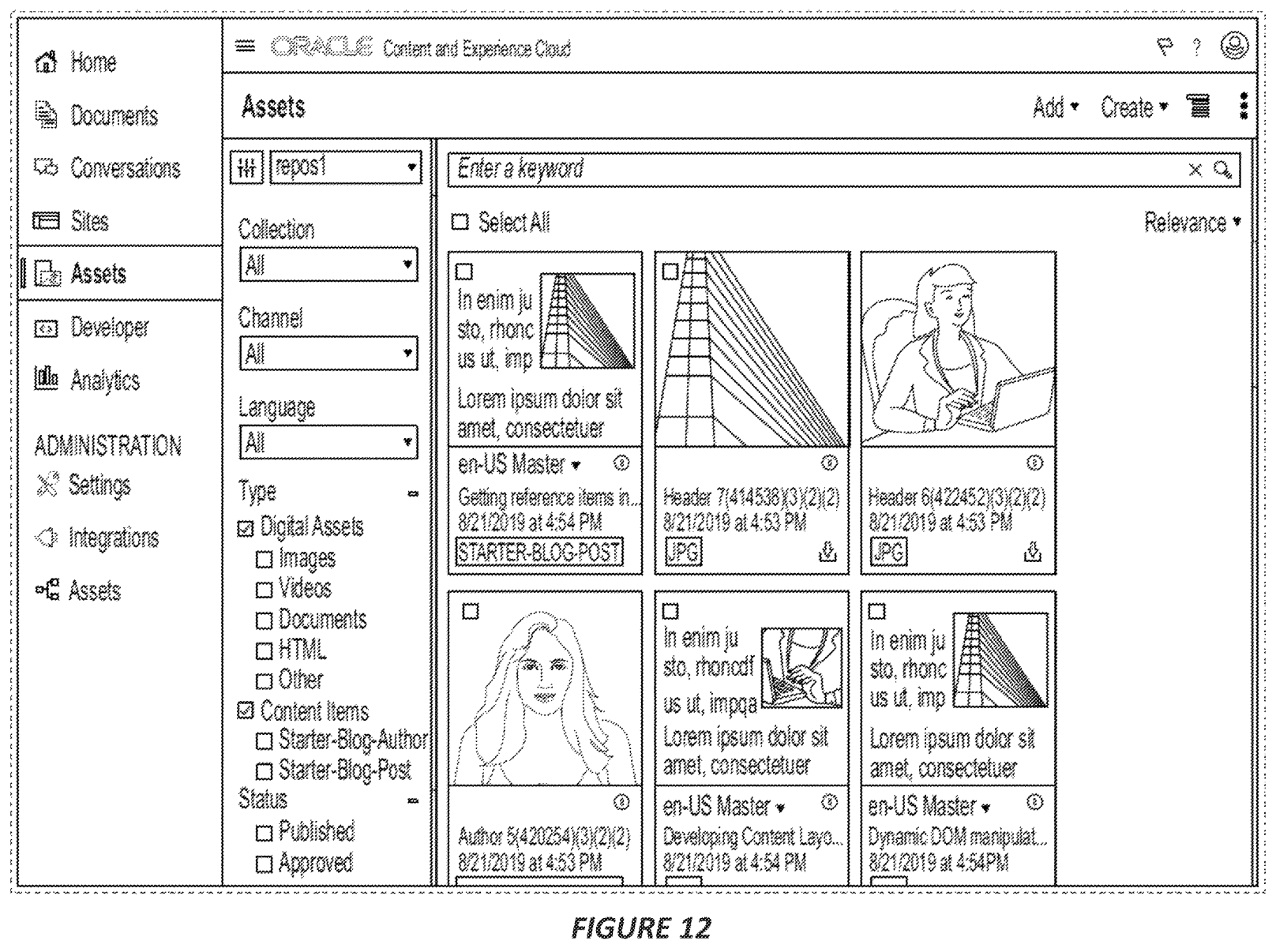

FIG. 12 is a screen shot of an exemplary website design portal/toolkit as provided in a cloud-based content hub, in accordance with an embodiment.

More particularly, FIG. 12 is a screen shot of exemplary website design portal/toolkit as provided in a cloud-based content hub showing a plurality of content assets that can be used within a designed website, in accordance with an embodiment. Such content assets can, for example, be stored at a content management system, as described above.

Figure 13:
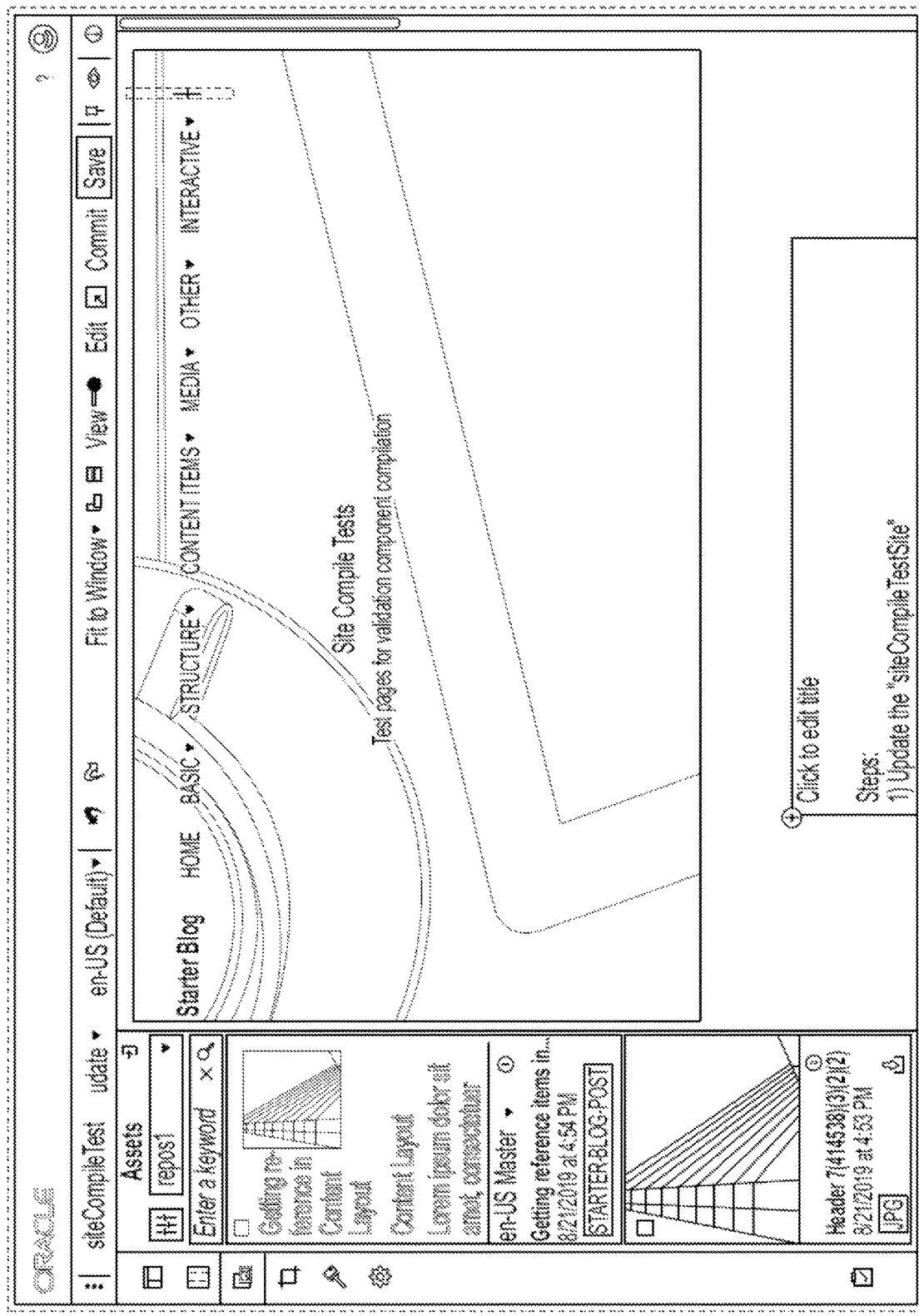
FIG. 13 is a screen shot of an exemplary website design portal/toolkit as provided in a cloud-based content hub, in accordance with an embodiment.

FIG. 13 is a screen shot of an exemplary website design portal/toolkit as provided in a cloud-based content hub, in accordance with an embodiment.

More particularly, FIG. 13 is a screen shot of exemplary website design portal/toolkit as provided in a cloud-based content hub showing a plurality of content assets that can be selected to be loaded, either statically or dynamically, into a website design, in accordance with an embodiment. Such content assets can, for example, be stored at a content management system, as described above.

Figure 14:
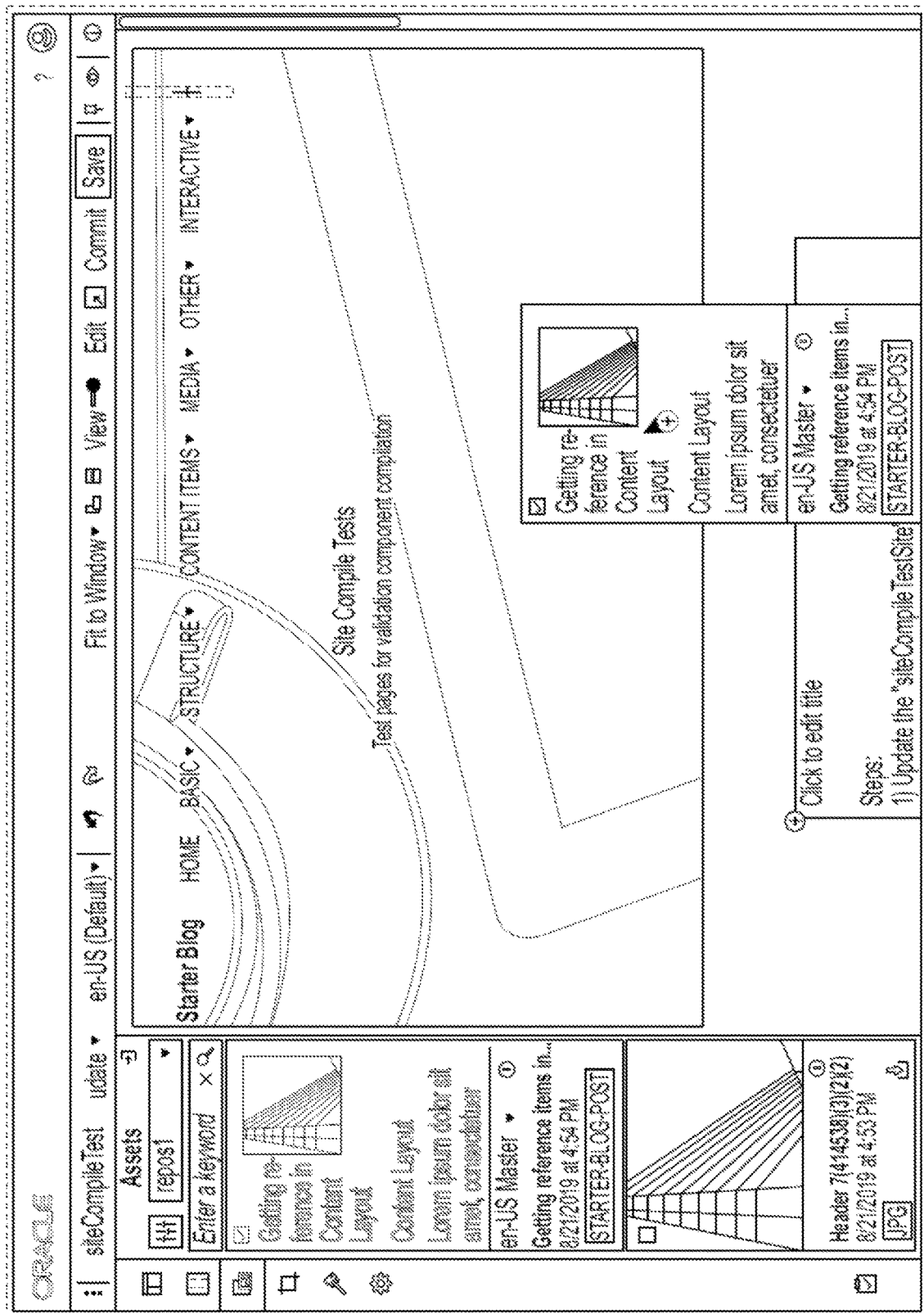
FIG. 14 is a screen shot of an exemplary website design portal/toolkit as provided in a cloud-based content hub, in accordance with an embodiment.

FIG. 14 is a screen shot of an exemplary website design portal/toolkit as provided in a cloud-based content hub, in accordance with an embodiment.

More particularly, FIG. 14 is a screen shot of exemplary website design portal/toolkit as provided in a cloud-based content hub showing drag and drop functionality of a content asset that can be selected to be loaded, either statically or dynamically, into a website design, in accordance with an embodiment. Such content asset can, for example, be stored at a content management system, as described above.

Figure 15:
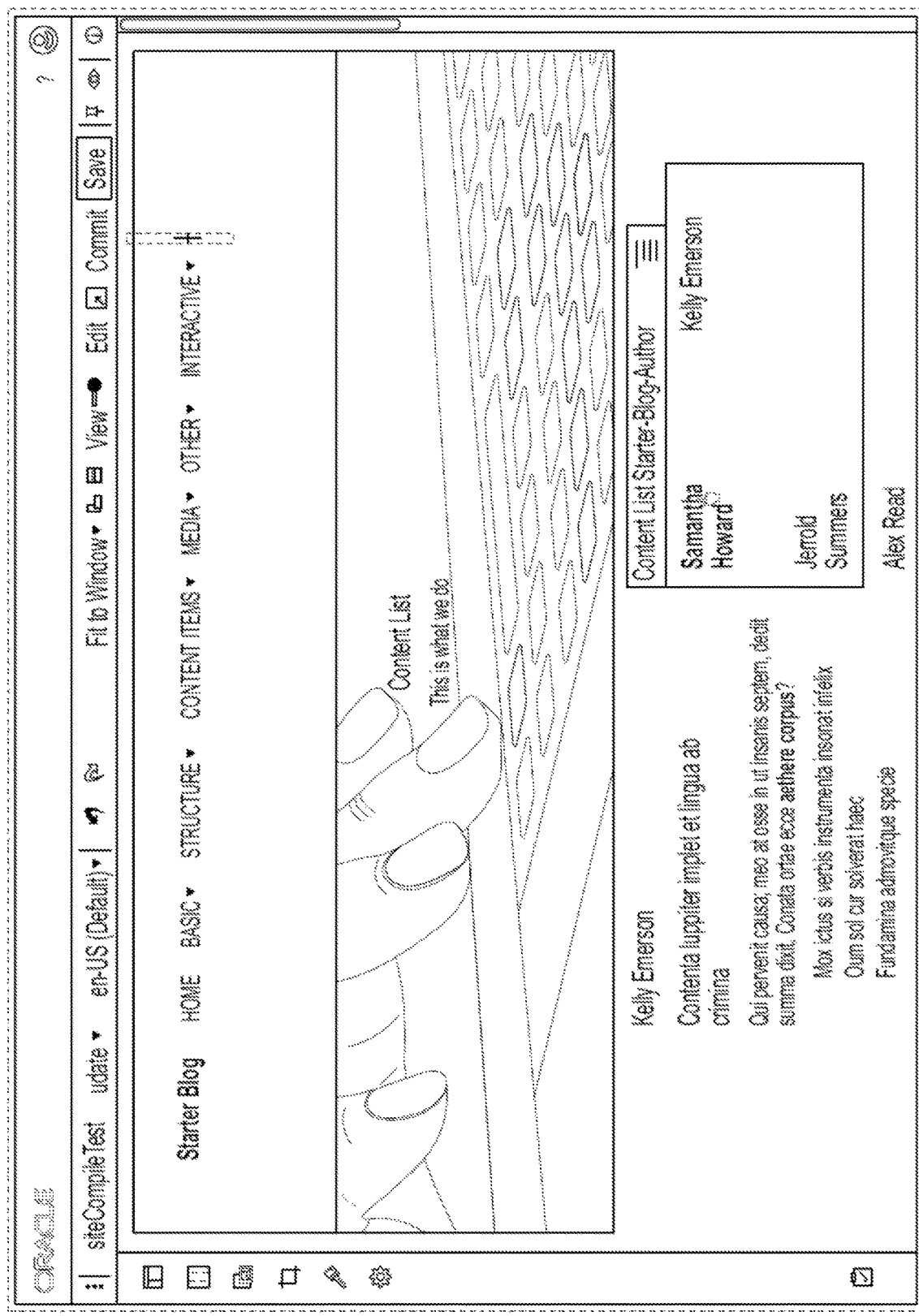
FIG. 15 is a screen shot of an exemplary website design portal/toolkit as provided in a cloud-based content hub, in accordance with an embodiment.

FIG. 15 is a screen shot of an exemplary website design portal/toolkit as provided in a cloud-based content hub, in accordance with an embodiment.

More particularly, FIG. 15 is a screen shot of exemplary website design portal/toolkit as provided in a cloud-based content hub showing a content item that has been selected/tagged to either be statically compiled into a published website, or dynamically fetched upon website load, in accordance with an embodiment. In the displayed screen shot of FIG. 9, the content list, "starter-blog-authors" can be designated as static and can be compiled into the published website such that load times of the website are reduced.

Figure 16A:
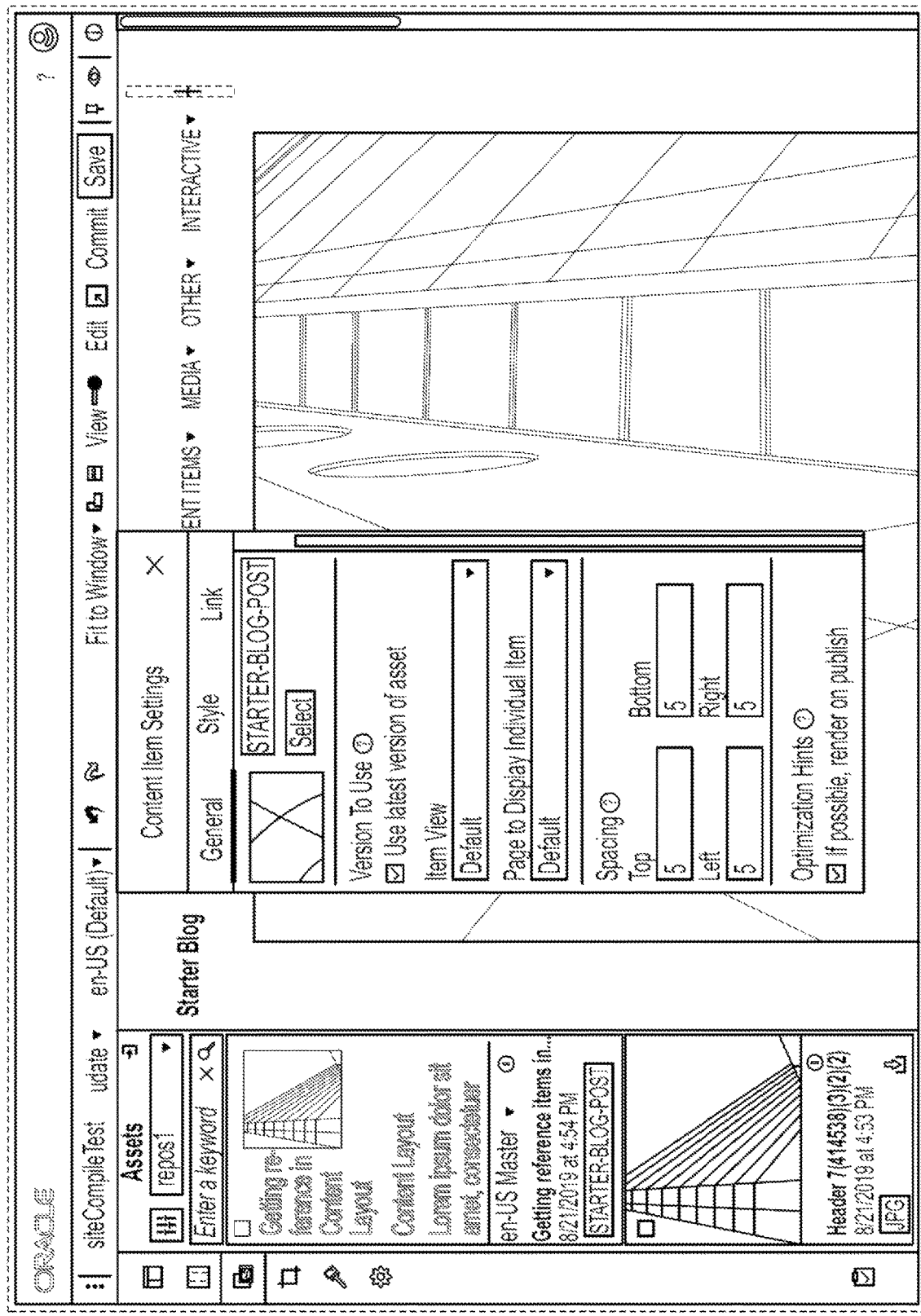
FIG. 16A is a screen shot of an exemplary website design portal/toolkit as provided in a cloud-based content hub, in accordance with an embodiment.

FIG. 16A is a screen shot of an exemplary website design portal/toolkit as provided in a cloud-based content hub, in accordance with an embodiment.

More particularly, FIG. 16A is a screen shot of exemplary website design portal/toolkit as provided in a cloud-based content hub showing a settings window for a selected content item. The setting window provides flagging options to a user to optionally render the content item when the website is published. In some embodiments, such an option can be selected via user interaction. In other embodiments, as described above, an engine can provide a suggested tag for such content items, or can even dynamically tag the content item without user interaction, again, as described above.

Figure 16B:
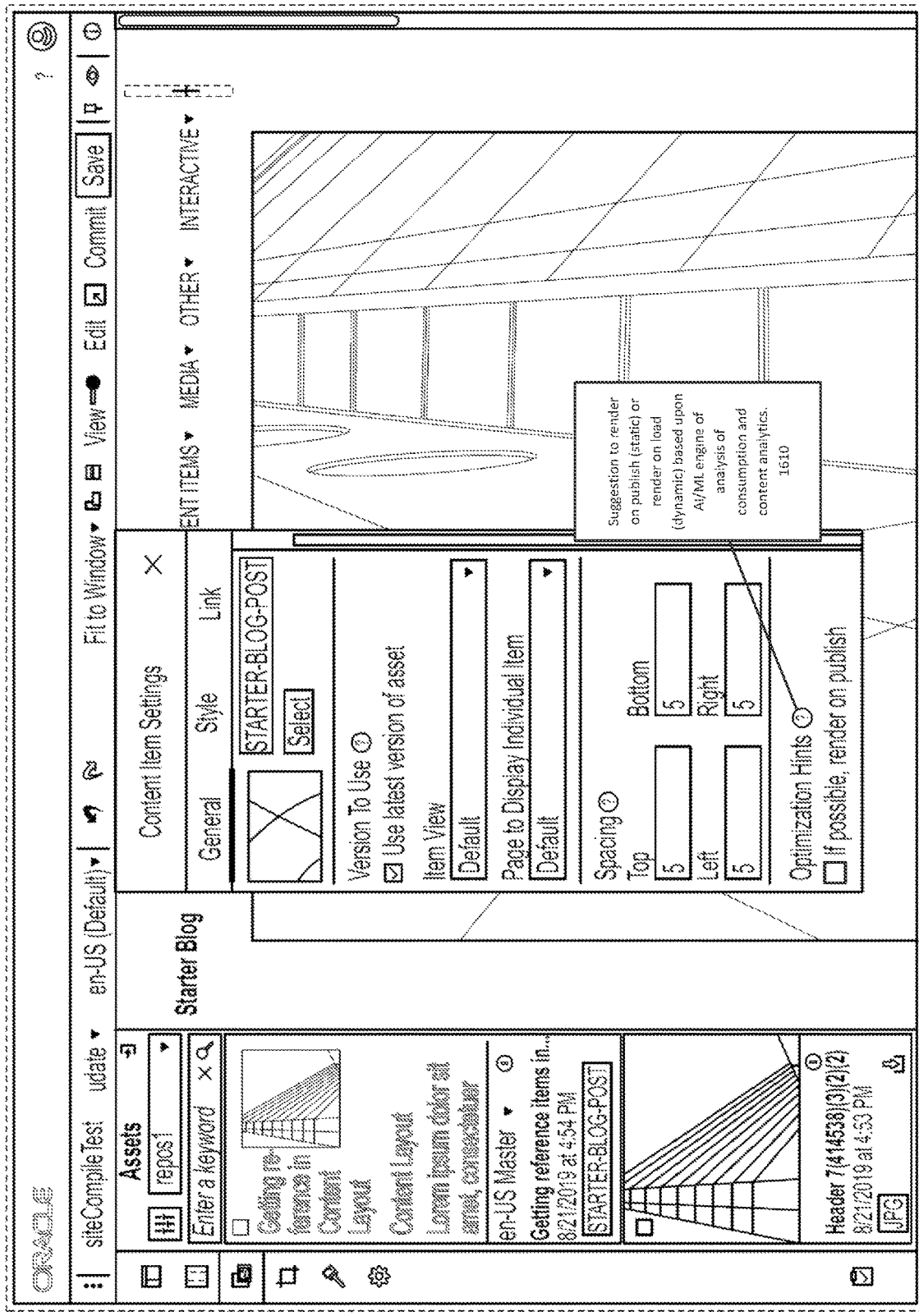
FIG. 16B is a screen shot of an exemplary website design portal/toolkit as provided in a cloud-based content hub, in accordance with an embodiment.

FIG. 16B is a screen shot of an exemplary website design portal/toolkit as provided in a cloud-based content hub, in accordance with an embodiment.

More particularly, FIG. 16B is a screen shot of exemplary website design portal/toolkit as provided in a cloud-based content hub showing a settings window for a selected content item. The Content Items Setting window can provide optimization hints 1610, e.g., upon a user or developer hovering over or selecting an interactive icon within the user interface. For example, the optimization hint can comprise, with respect to a selected content item on a page, a suggestion to render on publish (static) or render on load (dynamic). Such a suggestion 1610 can be based upon the AI/ML engine's analysis of one of or both of consumption or content analytics.

In accordance with an embodiment, in this way, the results of the AI/ML analysis of consumption and content analytics is surfaced to, e.g., a user or developer, via a user interface, in a way that provides a suggestion to a user to select any given piece of content on a site to be statically published (optimized) or left to be loaded dynamically, as described above.

Figure 16C:
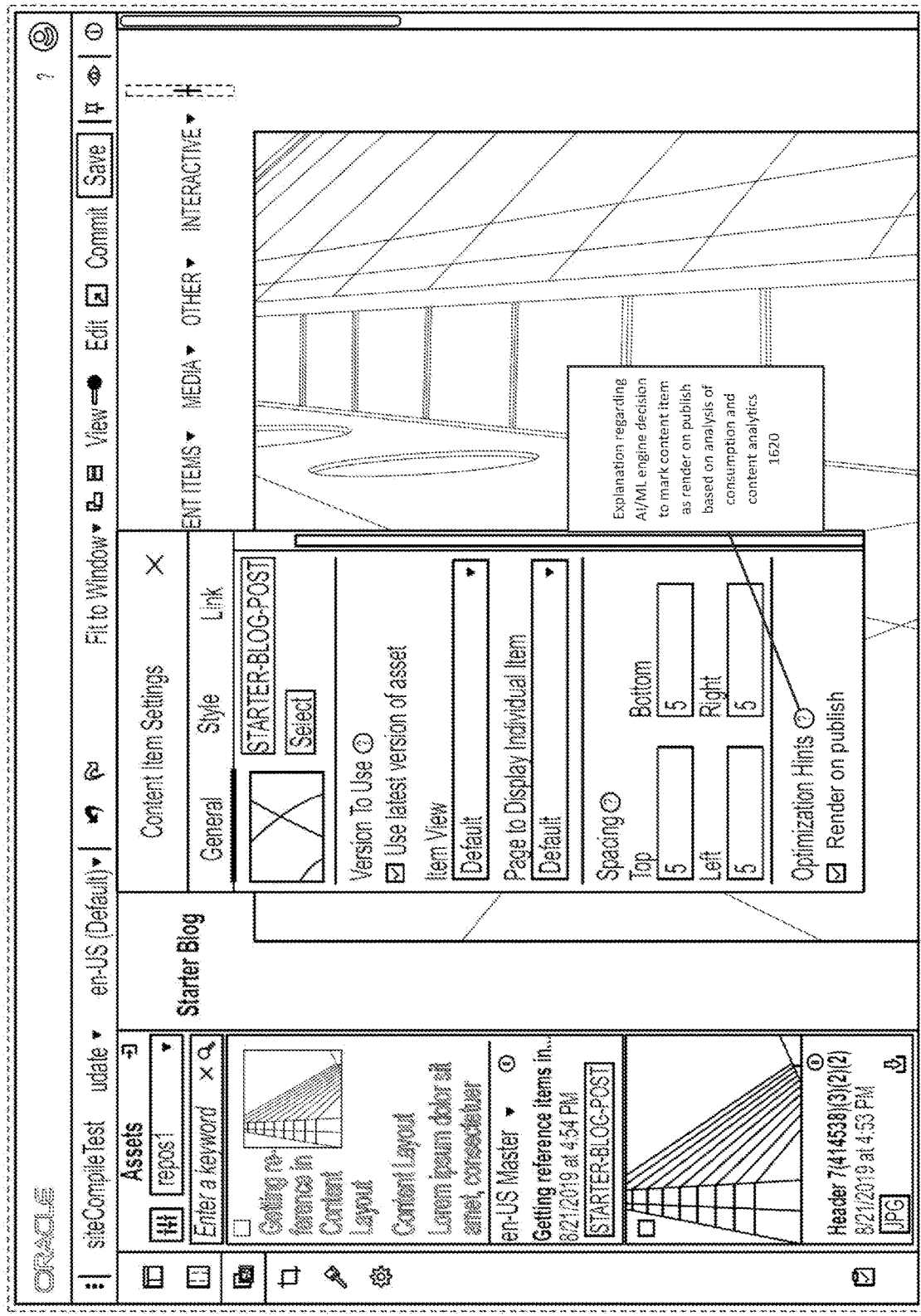
FIG. 16C is a screen shot of an exemplary website design portal/toolkit as provided in a cloud-based content hub, in accordance with an embodiment.

FIG. 16C is a screen shot of an exemplary website design portal/toolkit as provided in a cloud-based content hub, in accordance with an embodiment.

More particularly, FIG. 16C is a screen shot of exemplary website design portal/toolkit as provided in a cloud-based content hub showing a settings window for a selected content item. The Content Items Setting window can display an automatic/automated selection for optimization of content on a website, e.g., upon a user or developer hovering over or selecting an interactive icon within the user interface. For example, the optimization hint can comprise, with respect to a selected content item on a page, an explanation regarding an AI/ML engine's decision to mark a selected content item as render on publish (static) or render on load (dynamic) based upon an analysis of consumption and content analytics. Such an explanation 1620 can be based upon the AI/ML engine's analysis of one of or both of consumption or content analytics.

In accordance with an embodiment, in this way, the results of the AI/ML analysis of consumption and content analytics is surfaced to, e.g., a user or developer, via a user interface, in a way that provides an explanation to a user that the systems selected a piece of content on a site to be statically published (optimized) or left to be loaded dynamically, as described above.

In accordance with an embodiment, a user or site developer can override the static/dynamic decision made by the system based upon the AI/ML's analysis of content and consumption analytics.

Automatic Selection of Dynamic or Static Data

In accordance with an embodiment, instead of providing a suggestion, the system makes a determination and selects the pieces of content to be statically compiled. Such a decision making process can be based upon, e.g., a set of defined criteria (e.g., must have X level of certainty that this content changes from page view to page view). This can be useful, for example, when a content creator/marketer is being inundated with a voluminous number of options as presented by the above embodiment. In such cases, the option can be selected to have the suggestion engine take over the decision-making process with regard to statically compiled content.

Custom Components

As described above, in accordance with an embodiment, the system allows developers to work with a variety of technologies and optimize a page or site for runtime performance, including in some instances the use of a custom (component) compiler, for use during compilation of a particular component, to convert the component to HTML/CSS so that it can be injected into the page without the use of JavaScript.

Examples of the types of components that can be added to a page include paragraphs, titles, images, or dividers; which can be defined by local component files, or remote component files. Local component files are stored in a local server, and can be set to render directly within a page, or in an inline frame in the page. Remote component files are stored on a remote server, and are always rendered in an inline frame.

In accordance with an embodiment, a component can be associated with a JavaScript JSON (render.js) file; and can be additionally associated with a template that describes how its content will be displayed, for example within a site theme. Once added to a site, the developer can then edit a component's property settings, to address requirements such as page content, fonts and font sizes, image framing and placement, and other styles. For example, a local component can be defined as:

```
/Components/component-name
    appinfo.json
    _folder_icon.jpg
      assets
      settings.html
      render.js
```

As another example, a local component using an inline frame can be defined as:

```
/Components/component-name
    appinfo.json
    _folder_icon.jpg
      assets
    settings.html
      render.js
```

```
        js
          sites.min.js
            knockout.min.js
            jquery.min.js
```

As another example, a remote component can be defined as:

```
/Components/component-name
    appinfo.json
    _folder_icon.jpg
    keys.json
```

In accordance with an embodiment, the developer can create component-compilation-specific instructions for a particular component, which are passed during compilation and operate as a custom (component) compiler, to convert the particular component to HTML/CSS, so that the component can subsequently be injected into the page. Alternatively, if there is a custom compiler defined for a particular component, then the component-compilation-specific instructions associated with that particular component will be used to modify the resulting HTML to be inserted into the page. If there is no custom compiler defined for a particular component, then the component will be rendered per the usual process, for example via the component's render.js file.

In accordance with an embodiment, a custom compiler can also indicate that the component requires JavaScript "hydration" at runtime, in which case the component's hydrate( ) function within its render.js file will be called. Alternatively, if the component does not require hydration, then the component's render.js file is not loaded.

Figure 17:
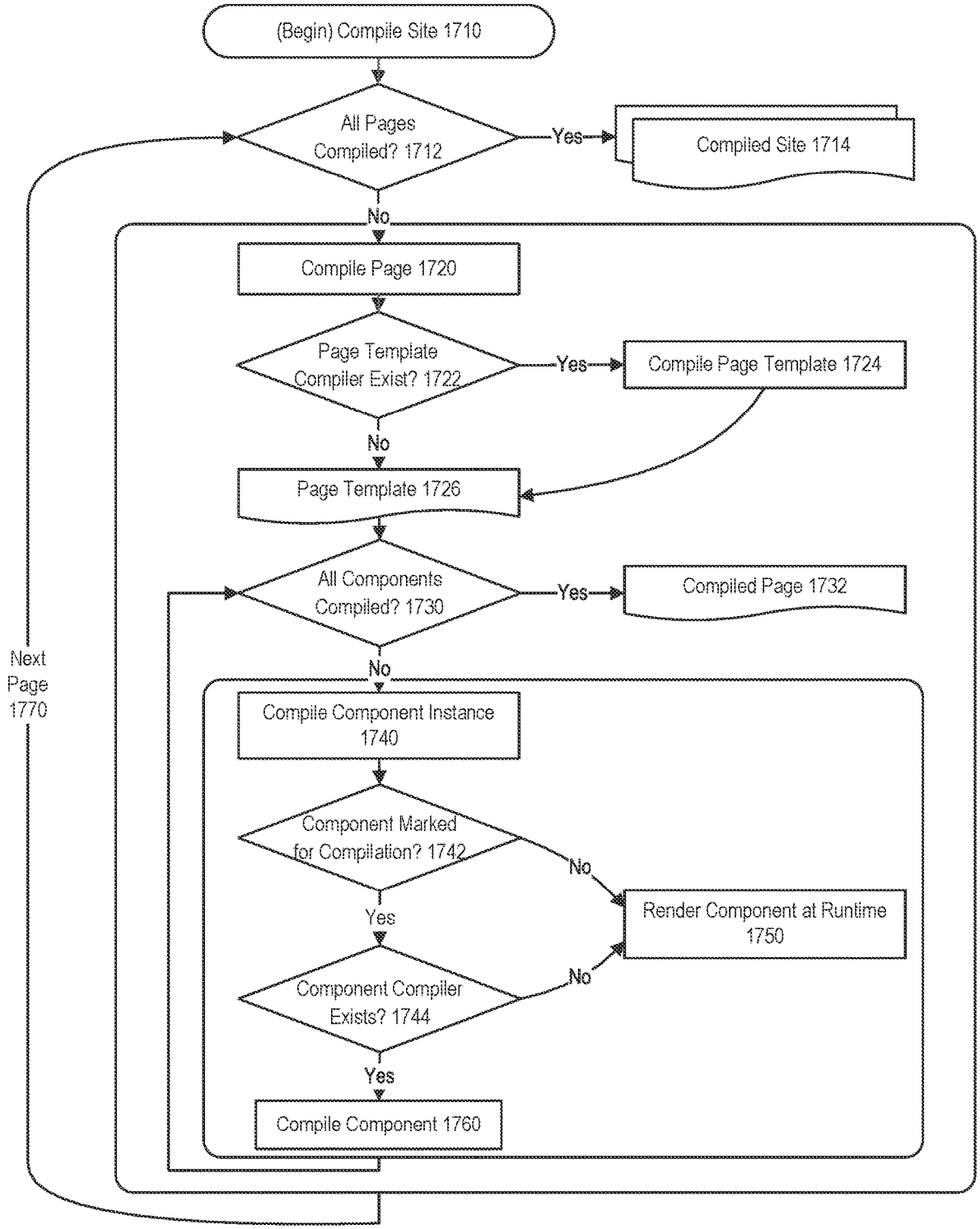
FIG. 17 illustrates a process for compilation of components in accordance with an embodiment.

FIG. 17 illustrates a process for compilation of components in accordance with an embodiment.

As illustrated in FIG. 17, in accordance with an embodiment, at 1710, a request is received to compile a site. For example, this can be a manual request, or it can be triggered automatically by editing of the site in the user interface, or by any of the various embodiments of AI/ML suggestion or prediction processes described above.

At 1712, a determination is made as to whether all pages have been compiled, and if so then, at 1714, the compiled site is provided.

Otherwise, at 1720, each of the pages that comprise the site are compiled. During compilation of a page, at 1722, a determination is made as to whether a page template compiler exists. If so, then at 1724, the page template is compiled. Otherwise at 1726, an existing page template can be used At 1730, a determination is made as to whether all components are compiled. If so, then at 1732, the page is compiled.

At 1740, each component instance that comprises the page are compiled. If, at 1742 a component is marked for compilation, and at 1744 a component compiler exists, then at 1760, the component is compiled. Otherwise, at 1750 the components is rendered at runtime.

Following compilation of all the components in the page, at 1770, the process is continued for each next page, until all of the pages in the site have been compiled.

Page Layout Compilers

In accordance with an embodiment, a Page Layout Compiler is provided as a JavaScript module that compiles the corresponding Page Layout. The Page Layout Compiler for a specific Page Layout is defined by name association with a "- compile.js" extension:

```
src
    themes
        <yourTheme>
            layouts
                <yourPageLayout>.html
                <yourPageLayout>-compile.js
```

If no "-compile.js" exists for a page layout then no custom compilation is applied. A page layout compiler needs to implement a "compileo" interface, which returns a promise. e.g.: about-compile.js:

```
var AboutPageCompiler = function ( ) { };
AboutPageCompiler.prototype.compile = function (args) {
    var self = this,
    layoutMarkup = args.layoutMarkup;
    self.SCSCompileAPI = args.SCSCompileAPI;
    return new Promise(function (resolve, reject) {
        var compiledPage = '';
        // do some work to compile the page
        compiledPage = doSomeWork(layoutMarkup);
        // return the compiled page
        resolve(compiledPage);
    });
};
module.exports = new AboutPageCompiler( );
```

Custom Compilers

In accordance with an embodiment, custom compilers are supported for: Page Layouts; Section Layouts; Custom Components; and Content Layouts. During compile, the compile-template command will look for a "compile.js" file in the same location as the "render.js" for the component:

```
src
    components
        <yourComponent>
            assets
                render.js
                compile.js
```

If this file doesn't exist, the component is not compiled and will be rendered at runtime. If the file does exist, it needs to implement a "compileo" interface, which returns a promise. e.g.:

```
var fs = require('fs'),
path = require('path'),
mustache = require('mustache');
var UWContentHeader = function ( ) { };
UWContentHeader.prototype.compile = function (args) {
    var compId = args.compId,
    customSettingsData = args.customSettingsData;
    return new Promise(function (resolve, reject) {
        try {
            var dir = ___dirname,
            templateFile = path.join(dir, 'compile.html'),
            template = fs.readFileSync(templateFile, 'utf8');
            var model = {
                title: customSettingsData.title || '',
                body: customSettingsData.body || ''
            };
            var markup = '';
            markup = mustache.render(template, model);
            return resolve({
                hydrate: false,
```

```
        content: markup
     });
   } catch (e) {
     console.log(type + ': failed to expand template');
     console.log(e);
   }
   return resolve({ });
  });
 };
 module.exports = new UWContentHeader( );
```

Component Hydration

As described above, component compilers insert HTML into the page. If A component needs additional JavaScript to be executed at runtime to add in things like event handlers, the one approach is to Inline JavaScript, i.e., you can insert a <script> tag directly into the returned compiled markup, which will execute as the page executes. e.g.:

```
<script src="../_sitesclouddelivery/renderer/libs/scs-
core/jssorslider/
js/jssor.slider.min.js" type="text/javascript"></script>
<div id="slider_container_c46b122d-978a-429d-aa25-9b5698428f6f"
style="position: relative; top: 0px; left: 0px; height: 400px; width:
600px;
background-color: rgb(68, 68, 68); visibility: visible;" data-
jssorslider="
1">
...
</div>
<script>
(function ( ) {
// get the required options
var options =
{"$FillMode":2,"$AutoPlay":false,"$AutoPlayInterval":3000,"$SlideDurat
ion":50
0,"$ArrowKeyNavigation":true,"$HWA":false,"$BulletNavigatorOptions":{"
$Chance
ToShow":1,"$AutoCenter":1,"$SpacingX":5},"$ArrowNavigatorOptions":{"$C
hanceTo
Show":1,"$AutoCenter":2,"$Steps":1},"$ThumbnailNavigatorOptions":{"$Ch
anceToS
how":0,"$Displaypieces":7,"$SpacingX":8,"$ParkingPosition":240}};
// select the JSSOR value options
options.$BulletNavigatorOptions.$Class =
$JssorBulletNavigator$;
options.$ArrowNavigatorOptions.$Class =
$JssorArrowNavigator$;
options.$ThumbnailNavigatorOptions.$Class =
$JssorThumbnailNavigator$;
// create the slider
var slider = new
$JssorSlider$("slider_container_c46b122d-978a-429d-aa25-9b5698428f6f",
options);
// resize, maintaining aspect ratio
var container = slider.$Elmt.parentElement;
if (container) {
slider.$ScaleWidth(container.getBoundingClientRect( ).width);
}
})( );
```

Hydrate Function

In accordance with an embodiment, an alternative approach is to include a hydrate function in the render.js file and note that the component requires hydration at runtime when you return the compiled markup. This avoids repetitious <script> tags as well as enabling you to leverage existing JavaScript code to managing eventing, e.g.:

```
  return resolve({
    hydrate: true,
        content: markup
     });
```

If a component notes that it needs hydration then, at runtime, the component's render.js file will be loaded and the hydrate( ) function called passing in the container <div> that contains the compiled markup, e.g.: render.hydrate( ):

```
this.hydrate = $.proxy(function (container) {
 var self = this,
 $container = $(container),
 $img = $container.find('scs-image'),
 $parentDiv = $img.parent( );
 // hydrate the trigger events
 $parentDiv.click(function (event) {
  self.viewModel.imageClicked($parentDiv[0],
```

-continued

```
event);
 });
 // hydrate the action handlers
 self.viewModel.imageWidth.subscribe(function
(newImageWidth) {
  // calculate the new image style
  var style;
  if (self.viewModel.showTopLayout( )) {
   style = '';
  } else {
```

-continued

```
style = 'flex-shrink:0;width:' +
newImageWidth + ';';
}
// update the sizing style
$parentDiv.attr('style', style);
});
```

Compile-Template Command

In accordance with an embodiment, the system also supports the use of a compile-template command, for example as a run-time command, or triggered by any of the AI/ML processes described above, which allows the developer (or system) to compile all of the site pages within a template, which pages can then be deployed to the site. The compile-template command has the following options:

cec compile-template <source>

The above command compiles all the pages within the site of the template and places the compiled pages under the sites assets folder. Command line options include, for example, the channel access token to use for content URLs, for example:

cec compile-template Temp1

Compiles the site in template Temp1, while:

cec compile-template Temp1-c channelToken

Which causes the system compiles the site in template Temp1 using the given channelToken for any content URLs, including:

For each page in the site: Read in the site and page meta-data; Read in the Page Layout and apply any page layout compiler.

For each slot on the page: Expand the slot with the grid defined in the page.json file.

For each component within the slot: Apply any component compiler; and Insert the generated component markup in the corresponding location within the slot.

Expand any macros in the compiled markup and insert the "SCS" JavaScript object that is used by the system renderer at runtime.

Save the compiled page markup under the src/templates/<template>/asset/pages folder.

Figure 18:
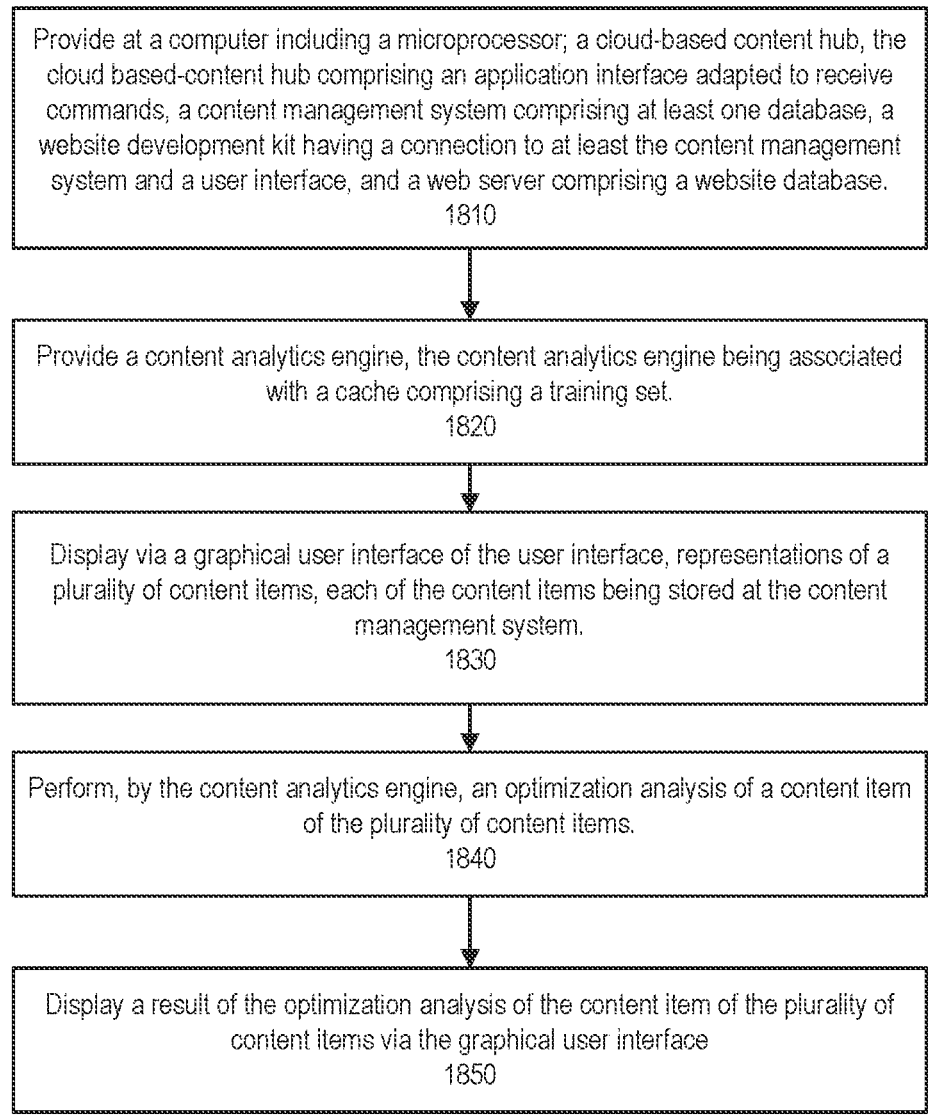
FIG. 18 is a flowchart of a method for providing a user interface for dynamic site compilation in a cloud-based content hub environment, in accordance with an embodiment.

FIG. 18 is a flowchart of a method for providing a user interface for dynamic site compilation in a cloud-based content hub environment, in accordance with an embodiment.

In accordance with an embodiment, at step 1810, the method can provide at a computer including a microprocessor; a cloud-based content hub, the cloud based-content hub comprising an application interface adapted to receive commands, a content management system comprising at least one database, a website development kit having a connection to at least the content management system and a user interface, and a web server comprising a website database.

In accordance with an embodiment, at step 1820, the method can provide a content analytics engine, the content analytics engine being associated with a cache comprising a training set.

In accordance with an embodiment, at step 1830, the method can display via a graphical user interface of the user interface, representations of a plurality of content items, each of the content items being stored at the content management system.

In accordance with an embodiment, at step 1840, the method can perform, by the content analytics engine, an optimization analysis of a content item of the plurality of content items.

In accordance with an embodiment, at step 1850, the method can display a result of the optimization analysis of the content item of the plurality of content items via the graphical user interface.

FIG. 19 is a flowchart of a method for providing custom component compilation within a cloud-based content hub environment, in accordance with an embodiment.

In accordance with an embodiment, at step 1910, the method can provide, at a computer including a microprocessor, a cloud-based content hub comprising an application interface adapted to receive commands, a content management system comprising at least one database, a website development kit having a connection to at least the content management system and a user interface, a web server comprising a website database, and a compiler, the compiler having access to a repository of compiler instructions.

In accordance with an embodiment, at step 1920, the method can receive an instruction to compile a website, the instruction including at least one content item at the content management database.

In accordance with an embodiment, at step 1930, the method can check an instance of the content item for metadata indicative of an indication to compile the content item statically or dynamically.

In accordance with an embodiment, at step 1940, the method can, upon the metadata being indicative to compile the instance of the content item statically, and upon a compiler instruction being present in the repository, the compiler instruction being associated with a type of the content item, compile the instance of the content item statically.

Figure 20:
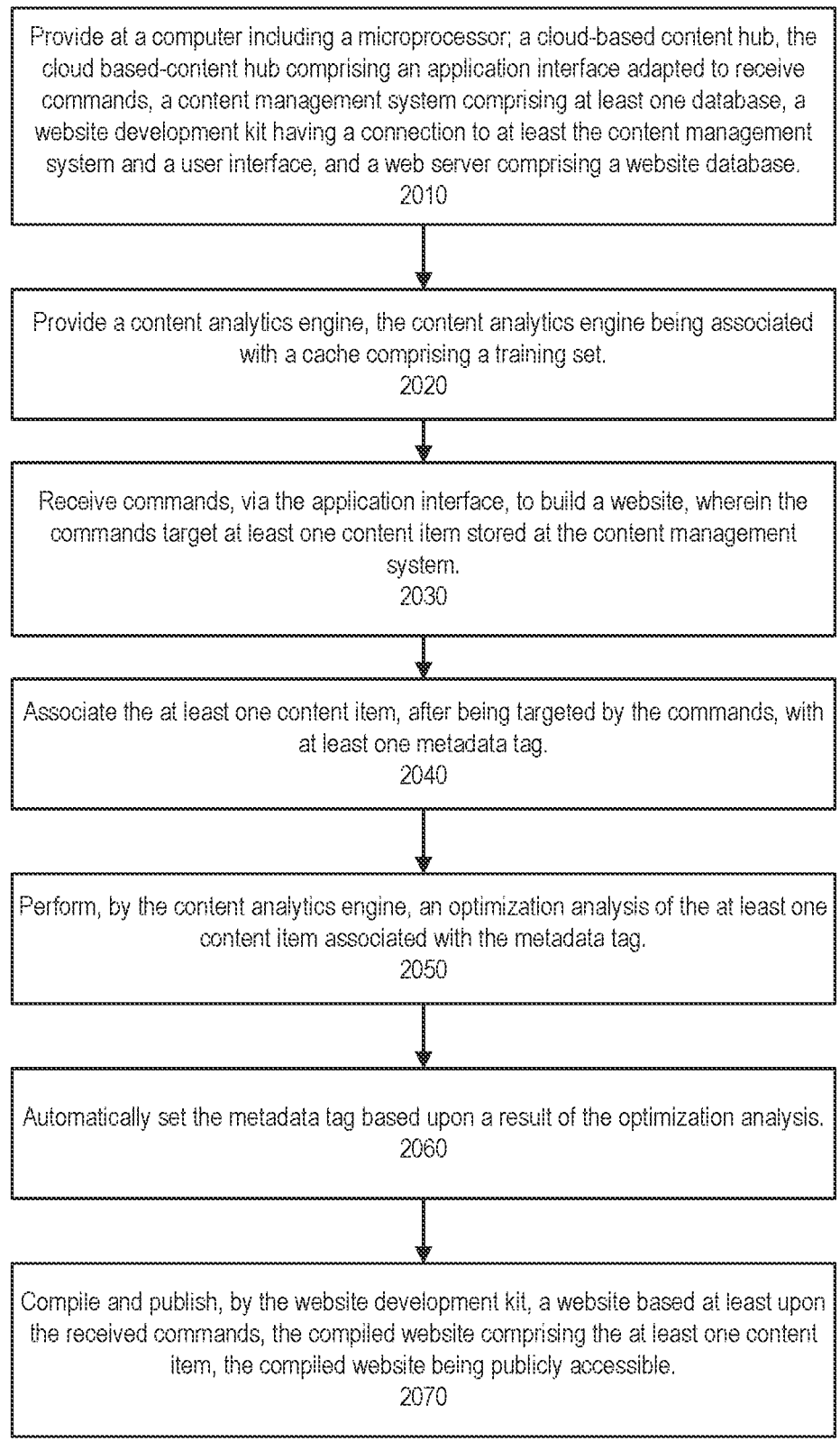
FIG. 20 is a flowchart of a method for automatic selection for dynamic site compilation in a cloud-based content hub environment, in accordance with an embodiment.

FIG. 20 is a flowchart of a method for automatic selection for dynamic site compilation in a cloud-based content hub environment, in accordance with an embodiment.

In accordance with an embodiment, at step 2010, the method can provide, at a computer including a microprocessor, a cloud-based content hub comprising an application interface adapted to receive commands, a content management system comprising at least one database, a website development kit having a connection to at least the content management system, and a web server comprising a website database.

In accordance with an embodiment, at step 2020, the method can provide a content analytics engine, the content analytics engine being associated with a cache comprising a training set.

In accordance with an embodiment, at step 2030, the method can receive commands, via the application interface, to build a website, wherein the commands target at least one content item stored at the content management system.

In accordance with an embodiment, at step 2040, the method can associate the at least one content item, after being targeted by the commands, with at least one metadata tag.

In accordance with an embodiment, at step 2050, the method can perform, by the content analytics engine, an optimization analysis of the at least one content item associated with the metadata tag.

In accordance with an embodiment, at step 2060, the method can automatically set the metadata tag based upon a result of the optimization analysis.

In accordance with an embodiment, at step 2070, the method can compile and publish, by the website development kit, a website based at least upon the received commands, the compiled website comprising the at least one content item, the compiled website being publicly accessible.

Figure 21:
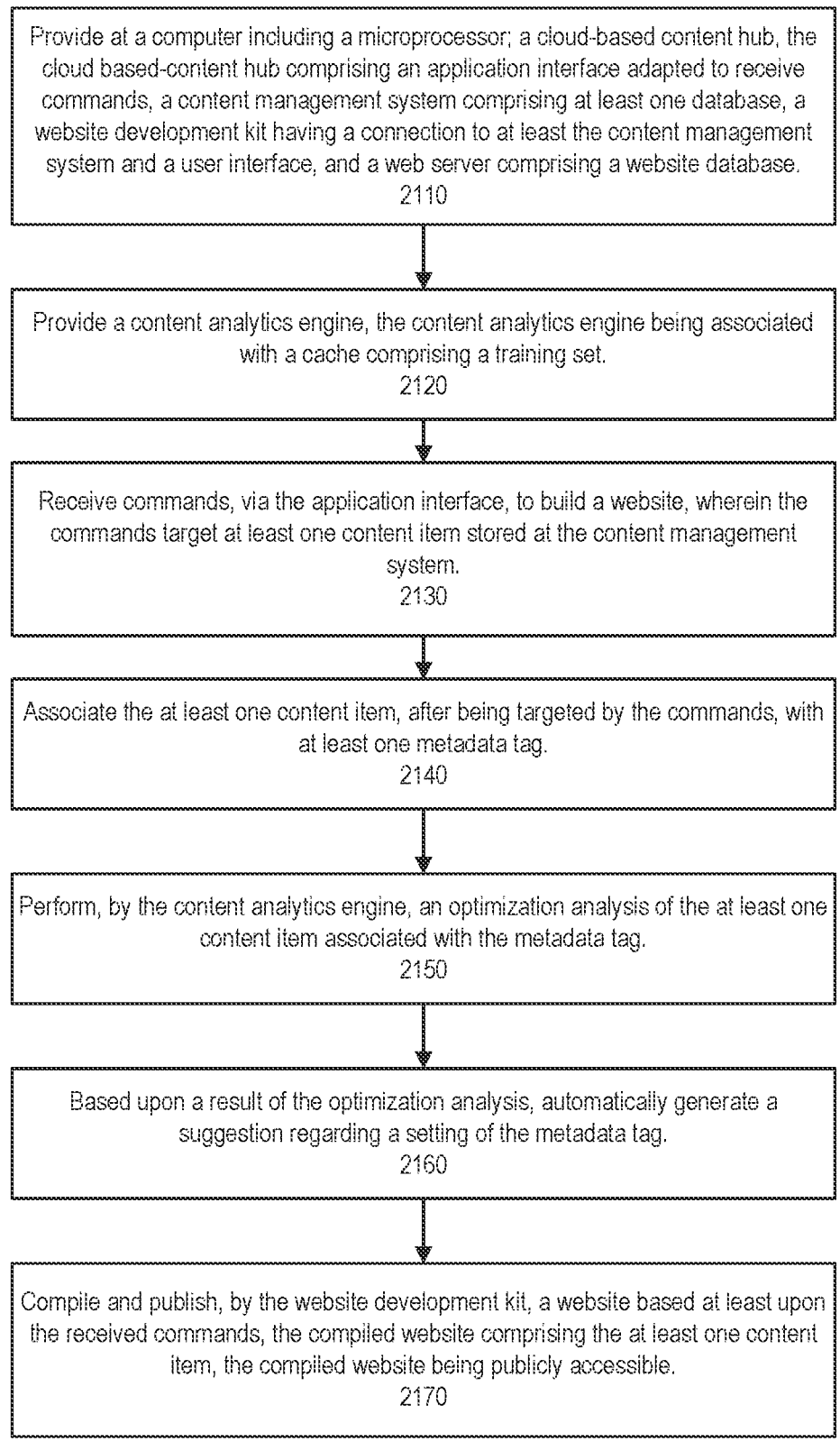
FIG. 21 is a flowchart of a method for automatic suggestion for dynamic site compilation in a cloud-based content hub environment, in accordance with an embodiment.

FIG. 21 is a flowchart of a method for automatic suggestion for dynamic site compilation in a cloud-based content hub environment, in accordance with an embodiment.

In accordance with an embodiment, at step 2110, the method can provide, at a computer including a microprocessor, a cloud-based content hub comprising an application interface adapted to receive commands, a content management system comprising at least one database, a website development kit having a connection to at least the content management system, and a web server comprising a website database.

In accordance with an embodiment, at step 2120, the method can provide a content analytics engine, the content analytics engine being associated with a cache comprising a training set.

In accordance with an embodiment, at step 2130, the method can receive commands, via the application interface, to build a website, wherein the commands target at least one content item stored at the content management system.

In accordance with an embodiment, at step 2140, the method can associate the at least one content item, after being targeted by the commands, with at least one metadata tag.

In accordance with an embodiment, at step 2150, the method can perform, by the content analytics engine, an optimization analysis of the at least one content item associated with the metadata tag.

In accordance with an embodiment, at step 2160, the method can, based upon a result of the optimization analysis, automatically generate a suggestion regarding a setting of the metadata tag.

In accordance with an embodiment, at step 2170, the method can compile and publish, by the website development kit, a website based at least upon the received commands, the compiled website comprising the at least one content item, the compiled website being publicly accessible While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, mini-computers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application program code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A system for dynamic site compilation in a cloud-based content environment, comprising:
   a computer including a microprocessor;
   a content management system accessible at a cloud environment and configured to communicate with a content database for storing content items, for publication and delivery of said content via websites or other online channels to client devices, and to associate metadata tags with items of content;
   wherein items of content that are tagged as static are stored and compiled with a website at a server that provides the content;
   wherein items of content that are tagged to be dynamically cached are stored at a dynamic content database, and pushed as updated to the website at the server; and
   a content analytics engine that assesses the content stored at the content management system, and automatically determines for select items of content one or more tags indicative of their suitability for static or dynamic compilation;
   wherein commands are received to build a website for delivery of content items stored at the content management system, the system compiles and publishes a website including one or more static and dynamic content, for delivery of content to the client devices.

2. The system of claim 1, wherein the website is compiled and published at a web server.

3. The system of claim 2,
   wherein the content analytics engine monitors and records content analytics associated with the at least one content item stored at the content management system; and
   wherein the content analytics engine monitors and records consumption analytics associated with the at least one content item published at the web server.

4. The system of claim 3,
   wherein the content analytics engine records the content analytics associated with the at least one content item stored at the content management system at a cache comprising a training set; and
   wherein the content analytics engine records the consumption analytics associated with the at least one content item published at the web server at the cache comprising the training set.

5. The system of claim 4, wherein based on at least the recorded content analytics and the recorded consumption analytics, the automatic setting of the metadata tag indicates the content item is to be statically compiled at the web server.

6. The system of claim 4, wherein based on at least the recorded content analytics and the recorded consumption analytics, the automatic setting of the metadata tag indicates the content item is to be dynamically loaded on a load or refresh of the website.

7. The system of claim 4, wherein the monitoring and recording, by the content analytics engine, of the content analytics associated with the at least one content item and the consumption analytics associated with the at least one content item is performed continuously.

8. A method for dynamic site compilation in a cloud-based content environment, comprising:
   providing, at a computer including a microprocessor, a content management system accessible at a cloud environment and configured to communicate with a content database for storing content items, for publication and delivery of said content via websites or other online channels to client devices, and to associate metadata tags with items of content;

wherein items of content that are tagged as static are stored and compiled with a website at a server that provides the content;

wherein items of content that are tagged to be dynamically cached are stored at a dynamic content database, and pushed as updated to the website at the server; and assessing, by a content analytics engine, the content stored at the content management system, and automatically determining for select items of content one or more tags indicative of their suitability for static or dynamic compilation;

wherein commands are received to build a website for delivery of content items stored at the content management system, compiling and publishing a website including one or more static and dynamic content, for delivery of content to the client devices.

9. The method of claim 8, wherein the website is compiled and published at a web server.

10. The method of claim 9,
wherein the content analytics engine monitors and records content analytics associated with the at least one content item stored at the content management system; and
wherein the content analytics engine monitors and records consumption analytics associated with the at least one content item published at the web server.

11. The method of claim 10,
wherein the content analytics engine records the content analytics associated with the at least one content item stored at the content management system at a cache comprising a training set; and
wherein the content analytics engine records the consumption analytics associated with the at least one content item published at the web server at the cache comprising the training set.

12. The method of claim 11, wherein based on at least the recorded content analytics and the recorded consumption analytics, the automatic setting of the metadata tag indicates the content item is to be statically compiled at the web server.

13. The method of claim 11, wherein based on at least the recorded content analytics and the recorded consumption analytics, the automatic setting of the metadata tag indicates the content item is to be dynamically loaded on a load or refresh of the website.

14. The method of claim 11,
wherein the monitoring and recording, by the content analytics engine, of the content analytics associated with the at least one content item and the consumption analytics associated with the at least one content item is performed continuously.

15. A non-transitory computer readable storage medium having instructions thereon for automatic selection for dynamic site compilation in a cloud-based content hub environment, which when read and executed by a computer cause the computer to perform steps comprising:

providing, at a computer including a microprocessor, a content management system accessible at a cloud environment and configured to communicate with a content database for storing content items, for publication and delivery of said content via websites or other online channels to client devices, and to associate metadata tags with items of content;

wherein items of content that are tagged as static are stored and compiled with a website at a server that provides the content;

wherein items of content that are tagged to be dynamically cached are stored at a dynamic content database, and pushed as updated to the website at the server; and assessing, by a content analytics engine, the content stored at the content management system, and automatically determining for select items of content one or more tags indicative of their suitability for static or dynamic compilation;

wherein commands are received to build a website for delivery of content items stored at the content management system, compiling and publishing a website including one or more static and dynamic content, for delivery of content to the client devices.

16. The non-transitory computer readable storage medium of claim 15, wherein the website is compiled and published at a web server.

17. The non-transitory computer readable storage medium of claim 16,
wherein the content analytics engine monitors and records content analytics associated with the at least one content item stored at the content management system; and
wherein the content analytics engine monitors and records consumption analytics associated with the at least one content item published at the web server.

18. The non-transitory computer readable storage medium of claim 17,
wherein the content analytics engine records the content analytics associated with the at least one content item stored at the content management system at a cache comprising a training set; and
wherein the content analytics engine records the consumption analytics associated with the at least one content item published at the web server at the cache comprising the training set.

19. The non-transitory computer readable storage medium of claim 18, wherein based on at least the recorded content analytics and the recorded consumption analytics, the automatic setting of the metadata tag indicates the content item is to be statically compiled at the web server.

20. The non-transitory computer readable storage medium of claim 18, wherein based on at least the recorded content analytics and the recorded consumption analytics, the automatic setting of the metadata tag indicates the content item is to be dynamically loaded on a load or refresh of the website.

* * * * *

UNITED STATES PATENT AND TRADEMARK OFFICE
CERTIFICATE OF CORRECTION

| | |
|---|---|
| PATENT NO. | : 11,727,083 B2 |
| APPLICATION NO. | : 17/850703 |
| DATED | : August 15, 2023 |
| INVENTOR(S) | : Fisher et al. |

It is certified that error appears in the above-identified patent and that said Letters Patent is hereby corrected as shown below:

In the Drawings

On sheet 20 of 23, in Figure 18, under Reference Numeral 1850, Line 2, delete "interface" and insert -- interface. --, therefor.

On sheet 21 of 23, in Figure 19, under Reference Numeral 1910, Line 7, delete "instructions" and insert -- instructions. --, therefor.

On sheet 21 of 23, in Figure 19, under Reference Numeral 1910, Line 8, delete "1910." and insert -- 1910 --, therefor.

On sheet 22 of 23, in Figure 20, under Reference Numeral 2010, Line 2, delete "cloud based-content" and insert -- cloud-based content --, therefor.

On sheet 23 of 23, in Figure 21, under Reference Numeral 2110, Line 2, delete "cloud based-content" and insert -- cloud-based content --, therefor.

In the Specification

In Column 4, Line 38, delete "embodiment" and insert -- embodiment. --, therefor.

In Column 7, Line 44, delete "page" and insert -- page. --, therefor.

In Column 23, Line 53, delete "used" and insert -- used. --, therefor.

In Column 24, Line 3, delete ""- compile.js"" and insert -- "-compile.js" --, therefor.

In Column 24, Line 15, delete ""compileo"" and insert -- "compile( )" --, therefor.

In Column 24, Line 47, delete ""compileo"" and insert -- "compile( )" --, therefor.

Signed and Sealed this
Ninth Day of July, 2024

*Katherine Kelly Vidal*
*Director of the United States Patent and Trademark Office*

CERTIFICATE OF CORRECTION (continued)
U.S. Pat. No. 11,727,083 B2

In Column 27, Line 49, delete "cloud based-content" and insert -- cloud-based content --, therefor.

In Column 29, Line 37, delete "accessible" and insert -- accessible. --, therefor.

In Column 30, Line 48, delete "(laaS)." and insert -- (IaaS), --, therefor.

In Column 30, Line 54, delete "laaS" and insert -- IaaS --, therefor.